(12) United States Patent
Ajami et al.

(10) Patent No.: US 12,445,261 B2
(45) Date of Patent: Oct. 14, 2025

(54) DYNAMIC SELECTION OF TRIGGERED TRANSMISSION OPPORTUNITY SHARING MODES

(71) Applicant: QUALCOMM Incorporated, San Diego, CA (US)

(72) Inventors: Abdel Karim Ajami, Lakeside, CA (US); Alfred Asterjadhi, San Diego, CA (US); George Cherian, San Diego, CA (US); Abhishek Pramod Patil, San Diego, CA (US); Yanjun Sun, San Diego, CA (US); Sai Yiu Duncan Ho, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 17/892,970

(22) Filed: Aug. 22, 2022

(65) Prior Publication Data

US 2024/0063995 A1    Feb. 22, 2024

(51) Int. Cl.
  *H04W 72/25* (2023.01)
  *H04L 5/14* (2006.01)
  *H04W 72/12* (2023.01)

(52) U.S. Cl.
  CPC ........... *H04L 5/1469* (2013.01); *H04W 72/12* (2013.01)

(58) Field of Classification Search
  None
  See application file for complete search history.

(56) References Cited

U.S. PATENT DOCUMENTS

| 2022/0303893 | A1* | 9/2022 | Chu | ................. H04W 76/40 |
| 2022/0408508 | A1* | 12/2022 | Chu | ................. H04L 1/1621 |
| 2023/0413327 | A1* | 12/2023 | Kim | ................. H04W 74/0816 |

* cited by examiner

*Primary Examiner* — Minh Trang T Nguyen
(74) *Attorney, Agent, or Firm* — Holland & Hart / QUALCOMM Incorporated

(57) ABSTRACT

Methods, systems, and devices for wireless communications are described. A first wireless device and a second wireless device (e.g., access points, stations) may support transmission opportunity (TXOP) sharing procedures. The second wireless device may transmit a frame indicating a capability of the second wireless device to support one or more triggered TXOP sharing modes. The second wireless device may transmit an indication (e.g., a frame) indicating to change support for the triggered TXOP sharing modes based on the capability. The change may indicate to suspend, resume, disable, or enable the triggered TXOP sharing modes. For example, the second wireless device may transmit an indication to suspend support of a first triggered TXOP sharing mode that enables the second wireless device to perform peer-to-peer transmissions. Accordingly, the first wireless device may trigger the second wireless device to communicate according to the supported triggered TXOP sharing modes.

30 Claims, 21 Drawing Sheets

DYNAMIC SELECTION OF TRIGGERED TRANSMISSION OPPORTUNITY SHARING MODES

FIELD OF TECHNOLOGY

The following relates to wireless communications, including dynamic selection of triggered transmission opportunity (TXOP) sharing modes.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include access points (APs) that may communicate with one or more stations (STAs) or mobile devices. An AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via DL and UL. The DL (or forward link) may refer to the communication link from the AP to the STA, and the UL (or reverse link) may refer to the communication link from the STA to the AP.

Some wireless communications systems (e.g., WLAN systems) may support traffic from real-time applications, which may be low-latency communications. Wireless devices may use a transmission opportunity (TXOP) sharing procedure to communicate such low-latency traffic. However, techniques for signaling which modes of TXOP sharing procedures wireless devices may support may be improved.

SUMMARY

The described techniques relate to improved methods, systems, devices, and apparatuses that support dynamic selection of triggered transmission opportunity (TXOP) sharing modes. For example, the described techniques provide for capability and operation indications in TXOP sharing procedure, which may enable wireless devices (e.g., access points (APs), stations (STAs)) to indicate which triggered TXOP sharing modes are supported, and when the wireless devices are to operate using the supported triggered TXOP sharing modes. To support a capability indication, the first wireless device may receive a capability message (e.g., via a frame) indicating that the second wireless device only supports triggered peer-to-peer (P2P) transmissions. Based on receiving the capability message, the first wireless device may trigger the second wireless device to perform a P2P transmission during a given TXOP sharing duration. Additionally, a second wireless device (e.g., an AP) may transmit a first frame indicating a change in support for a first triggered TXOP sharing mode, where the second wireless device may indicate support for the first triggered TXOP sharing mode in the capability message. The change may indicate to suspend, resume, enable, or disable the support for the first triggered TXOP sharing mode. Based on the first frame, the first wireless device may transmit a second frame that may trigger a data transmission by the second wireless device during a TXOP sharing duration, and using the first triggered TXOP sharing mode or a second triggered TXOP sharing mode.

A method for wireless communications at a first wireless device is described. The method may include receiving, from a second wireless device, a first frame indicating a first change mode request that identifies a change in support for a first triggered transmission opportunity sharing mode, the change indicating to suspend, resume, enable, or disable the support for the first triggered transmission opportunity sharing mode and transmitting, based on the first frame, a second frame that triggers a data transmission by the second wireless device during a transmission opportunity sharing duration in accordance with the first triggered transmission opportunity sharing mode or a second triggered transmission opportunity sharing mode.

An apparatus for wireless communications at a first wireless device is described. The apparatus may include a processor, memory coupled with the processor, and instructions stored in the memory. The instructions may be executable by the processor to cause the apparatus to receive, from a second wireless device, a first frame indicating a first change mode request that identifies a change in support for a first triggered transmission opportunity sharing mode, the change indicating to suspend, resume, enable, or disable the support for the first triggered transmission opportunity sharing mode and transmit, based on the first frame, a second frame that triggers a data transmission by the second wireless device during a transmission opportunity sharing duration in accordance with the first triggered transmission opportunity sharing mode or a second triggered transmission opportunity sharing mode.

Another apparatus for wireless communications at a first wireless device is described. The apparatus may include means for receiving, from a second wireless device, a first frame indicating a first change mode request that identifies a change in support for a first triggered transmission opportunity sharing mode, the change indicating to suspend, resume, enable, or disable the support for the first triggered transmission opportunity sharing mode and means for transmitting, based on the first frame, a second frame that triggers a data transmission by the second wireless device during a transmission opportunity sharing duration in accordance with the first triggered transmission opportunity sharing mode or a second triggered transmission opportunity sharing mode.

A non-transitory computer-readable medium storing code for wireless communications at a first wireless device is described. The code may include instructions executable by a processor to receive, from a second wireless device, a first frame indicating a first change mode request that identifies a change in support for a first triggered transmission opportunity sharing mode, the change indicating to suspend, resume, enable, or disable the support for the first triggered transmission opportunity sharing mode and transmit, based on the first frame, a second frame that triggers a data transmission by the second wireless device during a transmission opportunity sharing duration in accordance with the first triggered transmission opportunity sharing mode or a second triggered transmission opportunity sharing mode.

In some examples of the method, apparatuses, and non-transitory computer-readable medium described herein, the first frame includes a link identifier of a link to which the change in the support for the first triggered transmission opportunity sharing mode applies.

In some examples of the method, apparatuses, and non-transitory computer-readable medium described herein, the first frame indicates a time or a time offset associated with disablement, enablement, suspension, or resumption of the support for the first triggered transmission opportunity sharing mode.

Some examples of the method, apparatuses, and non-transitory computer-readable medium described herein may further include operations, features, means, or instructions for communicating with the second wireless device in accordance with the first triggered transmission opportunity sharing mode or the second triggered transmission opportunity sharing mode.

In some examples of the method, apparatuses, and non-transitory computer-readable medium described herein, the first frame indicates to suspend, resume, enable, or disable the support for the second triggered transmission opportunity sharing mode or a third triggered transmission opportunity sharing mode.

In some examples of the method, apparatuses, and non-transitory computer-readable medium described herein, the first frame indicates to suspend the support for the first triggered transmission opportunity sharing mode and receiving, from the second wireless device, a third frame indicating a second change mode request that identifies to resume the support for the first triggered transmission opportunity sharing mode.

In some examples of the method, apparatuses, and non-transitory computer-readable medium described herein, the first frame indicates the change in support for the first triggered transmission opportunity sharing mode for a defined time interval and transmitting the second frame that triggers the data transmission by the second wireless device during the transmission opportunity sharing duration that occurs subsequent to the defined time interval in accordance with the first triggered transmission opportunity sharing mode or the second triggered transmission opportunity sharing mode.

In some examples of the method, apparatuses, and non-transitory computer-readable medium described herein, the first frame may be a medium access control frame including a medium access control frame header that includes a control field indicating the change in the support for the first triggered transmission opportunity sharing mode.

In some examples of the method, apparatuses, and non-transitory computer-readable medium described herein, first frame may be a management frame indicating the change in the support for the first triggered transmission opportunity sharing mode.

In some examples of the method, apparatuses, and non-transitory computer-readable medium described herein, the first frame may be a control frame indicating the change in the support for the first triggered transmission opportunity sharing mode.

Some examples of the method, apparatuses, and non-transitory computer-readable medium described herein may further include operations, features, means, or instructions for communicating with the second wireless device during operation of the first triggered transmission opportunity sharing mode prior to receiving the first frame.

In some examples of the method, apparatuses, and non-transitory computer-readable medium described herein, the first triggered transmission opportunity sharing mode indicates that triggered uplink single-user transmissions and that triggered peer-to-peer transmissions may be both unsupported by the first wireless device, indicates that the triggered uplink single-user transmissions may be supported by the first wireless device, indicates that the triggered peer-to-peer transmissions may be supported by the first wireless device, or indicates that the triggered uplink single-user transmissions and the triggered peer-to-peer transmissions may be both supported by the first wireless device.

In some examples of the method, apparatuses, and non-transitory computer-readable medium described herein, the first wireless device may be an access point or a station, and where the second wireless device may be an access point or a station.

In some examples of the method, apparatuses, and non-transitory computer-readable medium described herein, the first wireless device may be affiliated with a multi-link device (MLD).

A method for wireless communications at a second wireless device is described. The method may include transmitting, to a first wireless device, a first frame indicating a first change mode request that identifies a change in support for a first triggered transmission opportunity sharing mode, the change indicating to suspend, resume, enable, or disable the support for the first triggered transmission opportunity sharing mode and receiving, in accordance with the first frame, a second frame that triggers a data transmission by the second wireless device during a transmission opportunity sharing duration in accordance with the first triggered transmission opportunity sharing mode or a second triggered transmission opportunity sharing mode.

An apparatus for wireless communications at a second wireless device is described. The apparatus may include a processor, memory coupled with the processor, and instructions stored in the memory. The instructions may be executable by the processor to cause the apparatus to transmit, to a first wireless device, a first frame indicating a first change mode request that identifies a change in support for a first triggered transmission opportunity sharing mode, the change indicating to suspend, resume, enable, or disable the support for the first triggered transmission opportunity sharing mode and receive, in accordance with the first frame, a second frame that triggers a data transmission by the second wireless device during a transmission opportunity sharing duration in accordance with the first triggered transmission opportunity sharing mode or a second triggered transmission opportunity sharing mode.

Another apparatus for wireless communications at a second wireless device is described. The apparatus may include means for transmitting, to a first wireless device, a first frame indicating a first change mode request that identifies a change in support for a first triggered transmission opportunity sharing mode, the change indicating to suspend, resume, enable, or disable the support for the first triggered transmission opportunity sharing mode and means for receiving, in accordance with the first frame, a second frame that triggers a data transmission by the second wireless device during a transmission opportunity sharing duration in accordance with the first triggered transmission opportunity sharing mode or a second triggered transmission opportunity sharing mode.

A non-transitory computer-readable medium storing code for wireless communications at a second wireless device is described. The code may include instructions executable by a processor to transmit, to a first wireless device, a first frame indicating a first change mode request that identifies a change in support for a first triggered transmission opportunity sharing mode, the change indicating to suspend, resume, enable, or disable the support for the first triggered transmission opportunity sharing mode and receive, in accordance with the first frame, a second frame that triggers a data transmission by the second wireless device during a transmission opportunity sharing duration in accordance with the first triggered transmission opportunity sharing mode or a second triggered transmission opportunity sharing mode.

In some examples of the method, apparatuses, and non-transitory computer-readable medium described herein, the first frame includes a link identifier of a link to which the change in the support for the first triggered transmission opportunity sharing mode applies.

In some examples of the method, apparatuses, and non-transitory computer-readable medium described herein, the first frame indicates a time or a time offset associated with disablement, enablement, suspension, or resumption of the support for the first triggered transmission opportunity sharing mode.

Some examples of the method, apparatuses, and non-transitory computer-readable medium described herein may further include operations, features, means, or instructions for communicating with the first wireless device in accordance with the first triggered transmission opportunity sharing mode or the second triggered transmission opportunity sharing mode.

In some examples of the method, apparatuses, and non-transitory computer-readable medium described herein, transmitting the first frame may include operations, features, means, or instructions for transmitting the first frame indicating the first change mode request that identifies to suspend, resume, enable, or disable the support for the second triggered transmission opportunity sharing mode or a third triggered transmission opportunity sharing mode.

In some examples of the method, apparatuses, and non-transitory computer-readable medium described herein, the first frame indicates to suspend the support for the first triggered transmission opportunity sharing mode and transmitting, to the first wireless device, a third frame indicating a second change mode request that identifies to resume the support for the first triggered transmission opportunity sharing mode.

In some examples of the method, apparatuses, and non-transitory computer-readable medium described herein, the first frame indicates the change in the support for the first triggered transmission opportunity sharing mode for a defined time interval and receiving the second frame that triggers the data transmission by the second wireless device during the transmission opportunity sharing duration that occurs subsequent to the defined time interval in accordance with the first triggered transmission opportunity sharing mode or the second triggered transmission opportunity sharing mode.

Some examples of the method, apparatuses, and non-transitory computer-readable medium described herein may further include operations, features, means, or instructions for transmitting one or more physical layer protocol data units using one or more receive chains, one or more transmit chains, and an operating channel width associated with the first triggered transmission opportunity sharing mode and suspending transmission of the one or more physical layer protocol data units based on receiving the second frame.

In some examples of the method, apparatuses, and non-transitory computer-readable medium described herein, the first frame may be a medium access control frame including a medium access control frame header that includes a control field indicating the change in the support for the first triggered transmission opportunity sharing mode.

In some examples of the method, apparatuses, and non-transitory computer-readable medium described herein, the first frame may be a management frame indicating the change in the support for the first triggered transmission opportunity sharing mode.

In some examples of the method, apparatuses, and non-transitory computer-readable medium described herein, the first frame may be a control frame indicating the change in the support for the first triggered transmission opportunity sharing mode.

Some examples of the method, apparatuses, and non-transitory computer-readable medium described herein may further include operations, features, means, or instructions for communicating with the first wireless device during operation of the first triggered transmission opportunity sharing mode prior to transmitting the first frame.

In some examples of the method, apparatuses, and non-transitory computer-readable medium described herein, the first triggered transmission opportunity sharing mode indicates that triggered uplink single-user transmissions and that triggered peer-to-peer transmissions may be both unsupported by the first wireless device, indicates that the triggered uplink single-user transmissions may be supported by the first wireless device, indicates that the triggered peer-to-peer transmissions may be supported by the first wireless device, or indicates that the triggered uplink single-user transmissions and the triggered peer-to-peer transmissions may be both supported by the first wireless device.

In some examples of the method, apparatuses, and non-transitory computer-readable medium described herein, the first wireless device may be an access point or a station and the second wireless device may be an access point or a station and the second wireless device may be affiliated with a multi-link device (MLD).

A method for wireless communications at a first wireless device is described. The method may include receiving, from a second wireless device, a first frame indicating that the second wireless device supports a first triggered transmission opportunity sharing mode of a set of multiple different transmission opportunity sharing modes, the first triggered transmission opportunity sharing mode indicating that the second wireless device only supports triggered peer-to-peer transmission and transmitting, in accordance with the first frame, a second frame that triggers a peer-to-peer transmission by the second wireless device during a transmission opportunity sharing duration.

An apparatus for wireless communications at a first wireless device is described. The apparatus may include a processor, memory coupled with the processor, and instructions stored in the memory. The instructions may be executable by the processor to cause the apparatus to receive, from a second wireless device, a first frame indicating that the second wireless device supports a first triggered transmission opportunity sharing mode of a set of multiple different transmission opportunity sharing modes, the first triggered transmission opportunity sharing mode indicating that the second wireless device only supports triggered peer-to-peer transmission and transmit, in accordance with the first frame, a second frame that triggers a peer-to-peer transmission by the second wireless device during a transmission opportunity sharing duration.

Another apparatus for wireless communications at a first wireless device is described. The apparatus may include means for receiving, from a second wireless device, a first frame indicating that the second wireless device supports a first triggered transmission opportunity sharing mode of a set of multiple different transmission opportunity sharing modes, the first triggered transmission opportunity sharing mode indicating that the second wireless device only supports triggered peer-to-peer transmission and means for transmitting, in accordance with the first frame, a second frame that triggers a peer-to-peer transmission by the second wireless device during a transmission opportunity sharing duration.

A non-transitory computer-readable medium storing code for wireless communications at a first wireless device is described. The code may include instructions executable by a processor to receive, from a second wireless device, a first frame indicating that the second wireless device supports a first triggered transmission opportunity sharing mode of a set of multiple different transmission opportunity sharing modes, the first triggered transmission opportunity sharing mode indicating that the second wireless device only supports triggered peer-to-peer transmission and transmit, in accordance with the first frame, a second frame that triggers a peer-to-peer transmission by the second wireless device during a transmission opportunity sharing duration.

In some examples of the method, apparatuses, and non-transitory computer-readable medium described herein, receiving the first frame may include operations, features, means, or instructions for receiving a set of bits in a field of the first frame indicating that the second wireless device supports the first triggered transmission opportunity sharing mode of the set of multiple different transmission opportunity sharing modes.

In some examples of the method, apparatuses, and non-transitory computer-readable medium described herein, receiving the first frame may include operations, features, means, or instructions for receiving the first frame as part of an association procedure performed with the second wireless device.

In some examples of the method, apparatuses, and non-transitory computer-readable medium described herein, the first triggered transmission opportunity sharing mode indicates that triggered uplink single-user transmissions and that triggered peer-to-peer transmissions may be both unsupported by the first wireless device, indicates that the triggered uplink single-user transmissions may be supported by the first wireless device, indicates that the triggered peer-to-peer transmissions may be supported by the first wireless device, or indicates that the triggered uplink single-user transmissions and the triggered peer-to-peer transmissions may be both supported by the first wireless device.

In some examples of the method, apparatuses, and non-transitory computer-readable medium described herein, the first wireless device may be an access point or a station, and where the second wireless device may be an access point or a station.

In some examples of the method, apparatuses, and non-transitory computer-readable medium described herein, the first wireless device may be a first access point and the second wireless device may be a second access point.

In some examples of the method, apparatuses, and non-transitory computer-readable medium described herein, the second frame indicates an access category, a traffic identifier, or both.

A method for wireless communications at a second wireless device is described. The method may include transmitting to a first wireless device, a first frame indicating that the second wireless device supports a first triggered transmission opportunity sharing mode of a set of multiple different triggered transmission opportunity sharing modes, the first triggered transmission opportunity sharing mode indicating that the second wireless device only supports triggered peer-to-peer transmission, receiving, in accordance with the first frame, a second frame that triggers a peer-to-peer transmission by the second wireless device during a transmission opportunity sharing duration, and transmitting, based on the first frame, the peer-to-peer transmission.

An apparatus for wireless communications at a second wireless device is described. The apparatus may include a processor, memory coupled with the processor, and instructions stored in the memory. The instructions may be executable by the processor to cause the apparatus to transmit to a first wireless device, a first frame indicating that the second wireless device supports a first triggered transmission opportunity sharing mode of a set of multiple different triggered transmission opportunity sharing modes, the first triggered transmission opportunity sharing mode indicating that the second wireless device only supports triggered peer-to-peer transmission, receive, in accordance with the first frame, a second frame that triggers a peer-to-peer transmission by the second wireless device during a transmission opportunity sharing duration, and transmit, based on the first frame, the peer-to-peer transmission.

Another apparatus for wireless communications at a second wireless device is described. The apparatus may include means for transmitting to a first wireless device, a first frame indicating that the second wireless device supports a first triggered transmission opportunity sharing mode of a set of multiple different triggered transmission opportunity sharing modes, the first triggered transmission opportunity sharing mode indicating that the second wireless device only supports triggered peer-to-peer transmission, means for receiving, in accordance with the first frame, a second frame that triggers a peer-to-peer transmission by the second wireless device during a transmission opportunity sharing duration, and means for transmitting, based on the first frame, the peer-to-peer transmission.

A non-transitory computer-readable medium storing code for wireless communications at a second wireless device is described. The code may include instructions executable by a processor to transmit to a first wireless device, a first frame indicating that the second wireless device supports a first triggered transmission opportunity sharing mode of a set of multiple different triggered transmission opportunity sharing modes, the first triggered transmission opportunity sharing mode indicating that the second wireless device only supports triggered peer-to-peer transmission, receive, in accordance with the first frame, a second frame that triggers a peer-to-peer transmission by the second wireless device during a transmission opportunity sharing duration, and transmit, based on the first frame, the peer-to-peer transmission.

In some examples of the method, apparatuses, and non-transitory computer-readable medium described herein, transmitting the first frame may include operations, features, means, or instructions for transmitting a set of bits in a field of the first frame indicating that the second wireless device supports the first triggered transmission opportunity sharing mode of the set of multiple different triggered transmission opportunity sharing modes.

In some examples of the method, apparatuses, and non-transitory computer-readable medium described herein, transmitting the first frame may include operations, features, means, or instructions for transmitting the first frame as part of an association procedure performed with the first wireless device.

In some examples of the method, apparatuses, and non-transitory computer-readable medium described herein, the first triggered transmission opportunity sharing mode indicates that triggered uplink single-user transmissions and that triggered peer-to-peer transmissions may be both unsupported by the first wireless device, indicates that the triggered uplink single-user transmissions may be supported by the first wireless device, indicates that the triggered peer-to-peer transmissions may be supported by the first wireless device, or indicates that the triggered uplink single-user transmissions and the triggered peer-to-peer transmissions may be both supported by the first wireless device.

In some examples of the method, apparatuses, and non-transitory computer-readable medium described herein, the first wireless device may be an access point or a station, and where the second wireless device may be an access point or a station.

In some examples of the method, apparatuses, and non-transitory computer-readable medium described herein, the first wireless device may be a first access point and the second wireless device may be a second access point.

In some examples of the method, apparatuses, and non-transitory computer-readable medium described herein, the second frame indicates an access category, a traffic identifier, or both.

DETAILED DESCRIPTION

Figure 1:
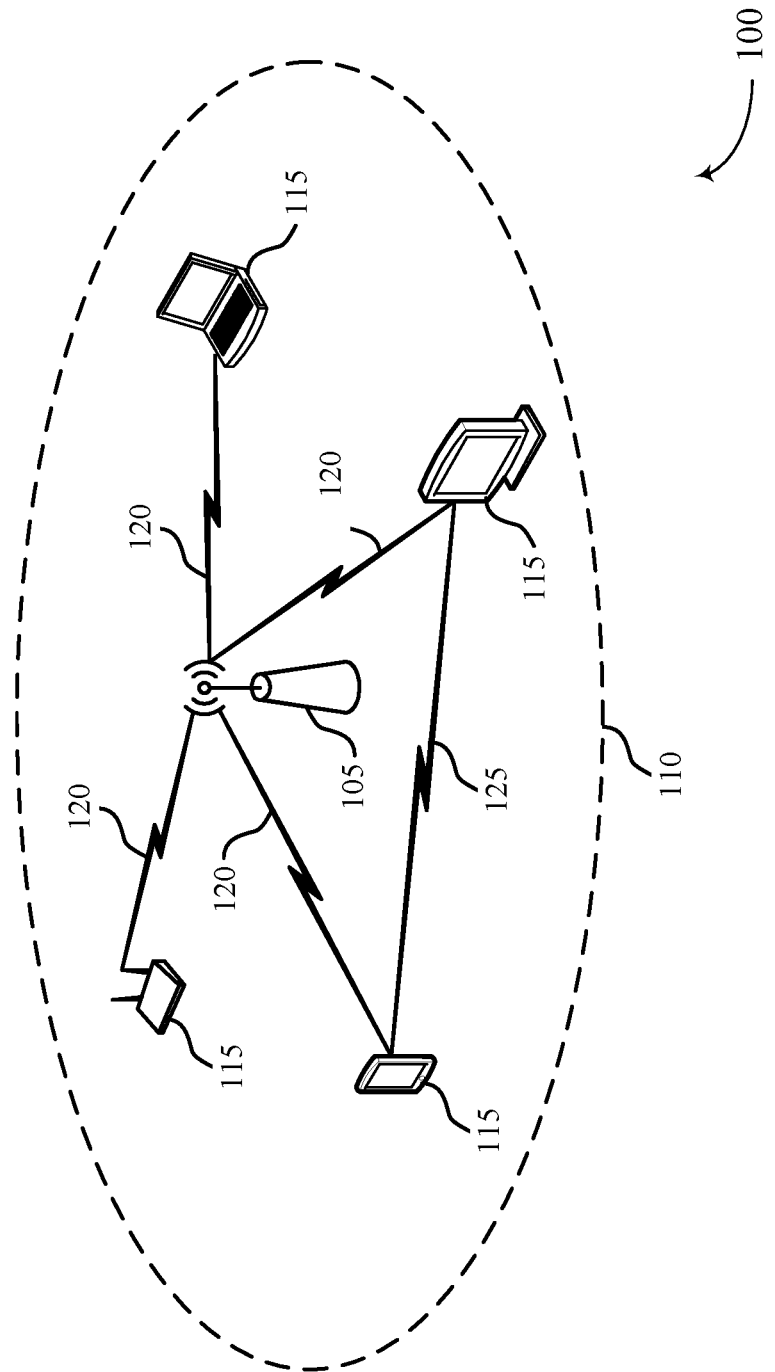
FIG. 1 illustrates an example of a wireless communications system that supports dynamic selection of triggered transmission opportunity (TXOP) sharing modes in accordance with one or more aspects of the present disclosure.

In some cases, wireless devices (such as Wi-Fi devices) may support multi-link operation (MLO) according to which the devices may communicate via multiple different links. For example, an access point (AP) multi-link device (MLD) may communicate with a non-AP MLD via a 2.4 gigahertz (GHz) link, a 5 GHz link, a 6 GHz link, or any combination thereof, which may generally be referred to as "sub-7" GHz bands. In some systems, an AP MLD and a non-AP MLD may be capable of communication via other radio frequency links, such as 45 GHz and 60 GHz links (e.g., non-sub-7 links), which may provide relatively higher data rates or greater link diversity.

In some examples, traffic originating from real-time applications, such as online gaming, may have stringent latency requirements. To serve such latency-sensitive traffic, wireless devices (e.g., APs, STAs) may use transmission opportunity (TXOP) sharing procedures. TXOP sharing may enable an AP to allocate a portion of time within an obtained TXOP to one non-AP STA for transmitting one or more physical layer protocol data units (PPDUs) to the AP or one or more peer STAs. However, some TXOP sharing procedures may lack support for signaling whether an STA is capable of supporting or operating using particular operating modes. For example, some TXOP sharing procedures may lack signaling for enabling, disabling, or suspending a triggered TXOP sharing procedure during operation in cases where an STA supports only peer-to-peer (P2P) transmission or lacks support for uplink single-user (SU) transmissions. As such, the wireless devices may be unable to communicate in some modes (e.g., just P2P transmissions) during a TXOP sharing duration, which may increase latency of real-time applications and reduce user experience as a quality of such communications may be degraded.

The techniques described herein support capability and operation indications in a TXOP sharing procedure, which may enable wireless devices (e.g., APs, STAs) to indicate which triggered TXOP sharing modes are supported, and when the wireless devices are to operate using the supported triggered TXOP sharing modes. To support a capability indication, a first wireless device may receive a capability message (e.g., via a frame) indicating that a second wireless device (e.g., an MLD STA) only supports triggered P2P transmissions. Based on receiving the capability message, the first wireless device may trigger the second wireless device to perform a P2P transmission during a given TXOP sharing duration.

To support an operation indication, a second wireless device (e.g., an AP STA or non-AP STA MLD) may transmit a first frame indicating a change in support for a first triggered TXOP sharing mode, where the second wireless device may indicate support for the first triggered TXOP sharing mode in the capability message. The change may indicate to suspend, resume, enable, or disable the support for the first triggered TXOP sharing mode. Based on the first frame, the first wireless device may transmit a second frame that may trigger a data transmission by the second wireless device during a TXOP sharing duration, and using the first triggered TXOP sharing mode or a second triggered TXOP sharing mode. In this way, based on the capability of the second wireless device, the first and second wireless devices may communicate according to one or more TXOP sharing modes during a TXOP shared duration, which may decrease latency for real-time applications.

Such implementations of the subject matter described in this disclosure also can be implemented to realize one or more of the following advantages. For example, in accordance with supporting dynamic selection of triggered TXOP sharing modes, the wireless devices (e.g., APs, STAs) may reduce latency provided by operating in particular triggered TXOP sharing modes during a TXOP sharing duration, and may increase the quality of communications between the wireless devices by supporting change mode requests that identify a change in support (e.g., suspension, resumption, deactivation, activation) for additional triggered TXOP sharing modes.

Aspects of the disclosure are initially described in the context of wireless communications systems. Aspects of the disclosure are then described in the context of field formats, transmission schemes, and process flows. Aspects of the disclosure are further illustrated by and described with reference to apparatus diagrams, system diagrams, and flowcharts that relate to dynamic selection of triggered transmission opportunity sharing modes.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a BSS or an ESS. The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS.

In some wireless communications systems 100, traffic originating from real-time applications may have stringent latency requirements (e.g., few to tens of milliseconds). For example, such latency-sensitive traffic may include online gaming and extended reality (XR) communications such as virtual reality (VR), augmented reality (AR), and mixed reality (MR) communications, among other traffic types. To serve such latency-sensitive traffic, wireless devices in the wireless communications system 100 (e.g., AP 105s, stations) may use triggered TXOP sharing procedures. Such procedures may enable an AP 105 to allocate a portion of time within an obtained TXOP to one or more non-access point stations for transmitting one or more PPDUs to the AP 105 or to peer stations. That is, once an AP 105 obtains a TXOP, the AP 105 may use a triggered TXOP sharing procedure to serve a STA 115 communicating P2P transmissions or uplink SU transmissions.

In some examples, however, TXOP sharing procedures may lack signaling or rules that enable a STA 115 to dynamically enable, disable, or suspend a particular triggered TXOP sharing procedure in operation. That is, some TXOP sharing procedures may not enable complete capability or operation signaling between an AP 105 and a station. For example, a STA 115 may transmit capability signaling to an associated AP 105 indicating a capability of the STA 115 to support a particular mode for triggered TXOP sharing (e.g., Mode 1, Mode 2, or both). If the STA 115 lacks support for P2P traffic, or prefers to be scheduled for uplink MU data transmissions instead of triggered uplink SU data transmissions (e.g., during a trigger-enabled target wakeup time (TWT) service period (SP)), the STA 115 may be unable to enable, disable, or suspend a particular triggered TXOP sharing procedure during operations (e.g., uplink SU operations, P2P operations, or both). Accordingly, the STA 115 may lack means to indicate to the AP 105 which modes the STA 115 may support and operate in to perform desired communications (e.g., P2P transmissions only) during a TXOP shared duration.

In some cases, a STA 115 (e.g., Si) may have a P2P link with an XR application (e.g., an XR glass, such as a pair of XR glasses worn by a user) and the STA 115 may communicate with an AP 105. The AP 105 may contend to obtain a TXOP within a beacon interval. In order to grant or share part of the TXOP with the station, the AP 105 may transmit a frame (e.g., an MU-request to send (RTS) transmission (TXS) frame) in which the STA 115 (e.g., a client) may respond with a clear-to-send (CTS) frame. This may enable the STA 115 to either transmit signaling back to the AP 105 or transmit data to the XR application based on a mode the AP 105 or the STA 115 has indicated support for, and for a duration that is indicated in the frame transmitted by the AP 105. That is, the AP 105 may initiate this TXOP sharing procedure by sending an MU RTS TXS frame with an allocated TXOP sharing duration (e.g., di). For example, if the entire TXOP is 5 ms (e.g., a TXOP duration), then the AP 105 may provide the STA 115 2 ms of the TXOP (e.g., a shared TXOP duration, di) for communicating with the XR application. The STA 115 may be expected to respond with a CTS within a short interframe space (SIFS) duration such that the triggered TXOP sharing procedure is successful. The STA 115 may operate using the second mode, which the AP 105 may use to share a TXOP with a STA 115 and thus, trigger uplink SU transmissions from the STA 115 back to the AP 105, or to grant the shared TXOP duration for P2P transmissions between the STA 115 and the XR application. Alternatively, the STA 115 may operate as a "soft" AP 105, and may send trigger frames to the XR application to solicit uplink transmissions.

In some cases, the STA 115 may operate in a first mode (e.g., Mode 1) in which the STA 115 supports uplink SU transmissions, or a second mode (e.g., Mode 2) in which the STA 115 supports both uplink SU transmissions and P2P transmissions. In some examples, P2P link traffic may be unavailable for the station. For example, the STA 115 may suspend a TXS trigger frame to enhance medium utilization efficiency, or the STA 115 may be busy with another operation and unable to respond to the MU-RTS TXS trigger frame using the first mode that solicits uplink transmissions within a SIFS duration. However, in some cases, the STA 115 may benefit from operating in alternative modes of TXOP sharing procedures, for example, in a case where the STA 115 may support P2P transmissions only.

The wireless communications system 100 may communicate capability and operation indications in a TXOP sharing procedure, which may enable wireless devices (e.g., APs 105, STAs 115, which may be MLD devices) to indicate which triggered TXOP sharing modes are supported, and when the wireless devices are to operate using the supported triggered TXOP sharing modes. To support a capability indication, the first wireless device may receive a capability message (e.g., via a frame) indicating that the second wireless device only supports triggered peer-to-peer (P2P) transmissions. Based on receiving the capability message, the first wireless device may trigger the second wireless device to perform a P2P transmission during a given TXOP sharing duration. Additionally, a second wireless device (e.g., an AP 105) may transmit a first frame indicating a change in support for a first triggered TXOP sharing mode, where the second wireless device may indicate support for the first triggered TXOP sharing mode in the capability message. The change may indicate to suspend, resume, enable, or disable the support for the first triggered TXOP sharing mode. Based on the first frame, the first wireless device may transmit a second frame that may trigger a data transmission by the second wireless device during a TXOP sharing duration, and using the first triggered TXOP sharing mode or a second triggered TXOP sharing mode.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, 802.11be, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

Figure 2:
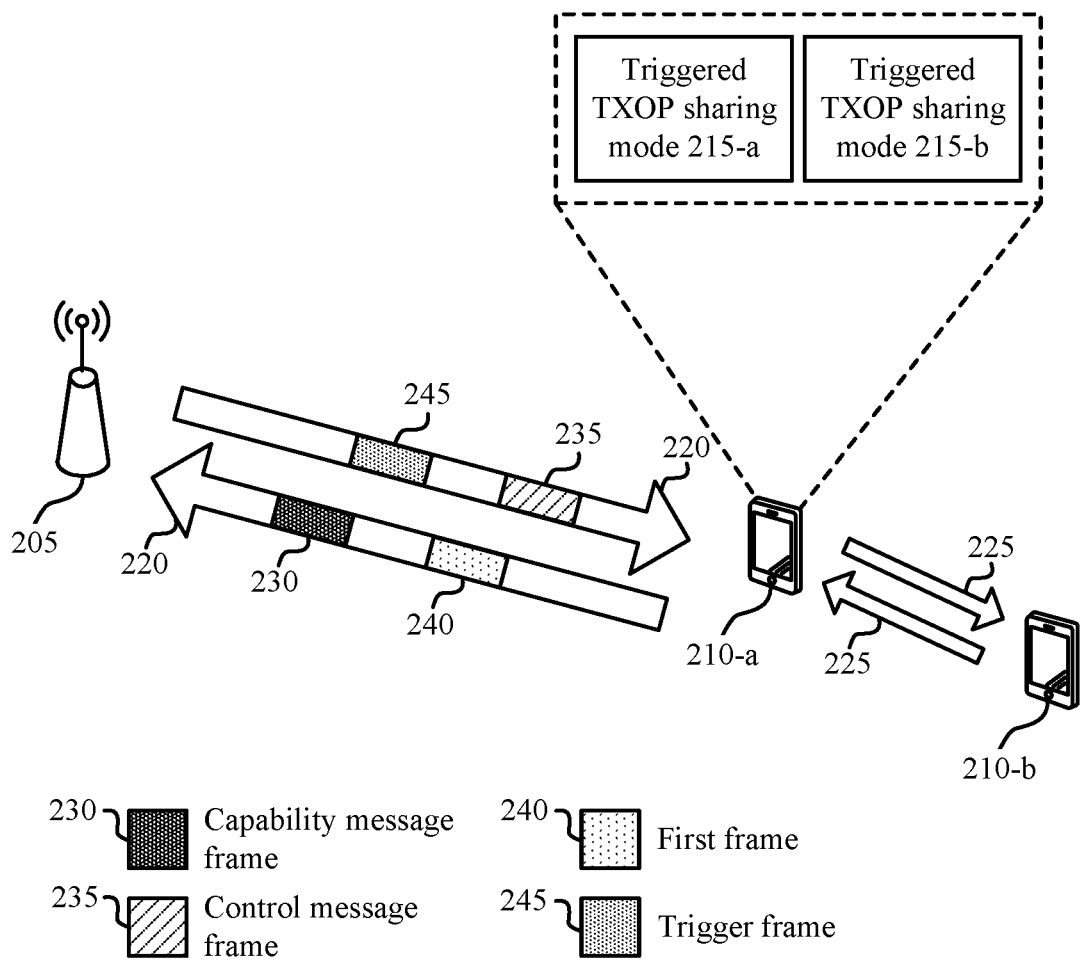
FIG. 2 illustrates an example of a wireless communications system that supports dynamic selection of triggered TXOP sharing modes in accordance with one or more aspects of the present disclosure.

FIG. 2 illustrates an example of a wireless communications system 200 that supports dynamic selection of triggered transmission opportunity sharing modes in accordance with one or more aspects of the present disclosure. In some examples, the wireless communications system 200 may implement aspects of the wireless communications system 100 or may be implemented by aspects of the wireless communications system 100. For example, the wireless communications system 200 may include a first wireless device 205, a second wireless device 210-*a*, and a second wireless device 210-*b*, which may be examples of corresponding devices as described herein. In some examples, the first wireless device 205 and the second wireless device 210-*a* may both be APs (e.g., a network entity, a STA), the first wireless device 205 and the second wireless device 210-*a* may both be STAs (e.g., UEs, non-AP STAs), or the first wireless device 205 may be an AP and the second wireless device 210-*a* may be a STA. In some examples, the second wireless device 210-*a* may be affiliated with an MLD (e.g., an AP STA MLD or a non-AP STA MLD). The wireless communications system 200 may support communications between the first wireless device 205 and the second wireless device 210-*a* using a triggered TXOP sharing mode 215.

The wireless communications system 200 may support communications between the first wireless device 205 and the second wireless device 210-*a*. For example, the first wireless device 205 may communicate with the second wireless device 210-*a* via respective communication links 220, which may be examples of a communication link 125 described with reference to FIG. 1. Additionally, the second wireless device 210-*a* may communicate with the second wireless device 210-*b* via respective communication links 225, which may be examples of P2P links.

The second wireless device 210-*a* may support a set of multiple triggered TXOP sharing modes 215, such as a triggered TXOP sharing mode 215-*a* and a triggered TXOP sharing mode 215-*b*. In some examples, the first wireless device 205 and the second wireless device 210-*a* may use a triggered TXOP sharing mode 215 as part of a TXOP sharing procedure, which may enable the first wireless device 205 to allocate a portion of time within an obtained TXOP to a second wireless device 210 (e.g., a non-AP STA) for transmitting one or more data transmissions (e.g., PPDUs).

In some examples, the first wireless device 205 and the second wireless device 210-*a* may support the dynamic selection of the triggered TXOP sharing modes 215 based on a capability and an operation mode of the second wireless device 210-*a*. That is, the second wireless device 210-*a* may transmit signaling to the first wireless device 205 indicating which triggered TXOP sharing modes 215 the second wireless device 210-*a* may support (e.g., may be capable of using) and which triggered TXOP sharing modes 215 the second wireless device 210-*a* may prefer to operate in.

In some cases, the first wireless device 205 and the second wireless device 210-*a* may support a set of triggered TXOP sharing modes. The set of triggered TXOP sharing modes may include a first mode (e.g., Mode 0) that indicates that triggered uplink SU transmissions and that triggered P2P transmissions are both unsupported by the first wireless device 205 or the second wireless device 210-*a* (e.g., indicates that the second wireless device 210-*a* lacks support for this mode), a second mode (e.g., Mode 1) that indicates that the first wireless device 205 and the second wireless device 210-*a* support the triggered uplink SU transmissions, a third mode (e.g., Mode 2) that indicates that the first wireless device 205 and the second wireless device 210-*a* support the triggered P2P transmissions, and a fourth mode (e.g., Mode 3) that indicates that the first wireless device 205 and the second wireless device 210-*a* support both the triggered uplink SU transmissions and the triggered P2P transmissions. In some cases, the first wireless device 205 and the second wireless device 210-*a* may support one or more additional (e.g., new) triggered TXOP sharing modes 215. For example, a new triggered TXOP sharing mode may be used for coordinated-TDMA (C-TDMA) communications.

To support a capability indication for the triggered TXOP sharing procedure, the first wireless device 205 may receive, from the second wireless device 210-*a*, a frame 230 (e.g., a data frame, a control frame, a management frame), which may be part of a capability message, indicating that the second wireless device 210-a supports the triggered TXOP sharing mode 215-a of a set of triggered TXOP sharing modes 215. The triggered TXOP sharing mode 215-a may indicate that the second wireless device 210-a only supports triggered P2P transmission, or that triggered uplink SU transmission is unsupported by the second wireless device 210-a. That is, the triggered TXOP sharing mode 215-a may correspond to the third mode (e.g., Mode 2), which indicates that the first wireless device 205 and the second wireless device 210-a only support the triggered P2P transmissions. In some examples, the second wireless device 210-a (e.g., a non-AP STA or other STA) may transmit the frame 230 based on the second wireless device 210-a supporting triggered TXOP sharing. For example, if the second wireless device 210-a has a configuration dot11EHTTXOPSharingTFOptionImplemented set to true, the second wireless device 210-a may transmit the frame 230 to indicate to its associated AP (e.g., the first wireless device 205) which triggered TXOP sharing modes 215 it supports (e.g., Modes 1, 2, or 3, or none of the triggered TXOP sharing modes 215 as indicated by Mode 0).

In some examples, the second wireless device 210-a may indicate which triggered TXOP sharing modes 215 it supports by setting one or more corresponding bits to 1 in an EHT capabilities element it transmits in the frame 230. For example, the first wireless device 205 may receive a set of bits in a field of the frame 230 indicating that the second wireless device 210-a supports the first TXOP sharing mode. In some cases, the first wireless device 205 (e.g., an EHT AP) may refrain from sending an MU-RTS TXS trigger frame with a triggered TXOP sharing mode subfield equal to 1, 2, or 3 (e.g., indicating a corresponding Mode 1, Mode 2, or Mode 3), and with a user information field that is addressed to an associated non-AP STA (e.g., the second wireless device 210-a) from which it has not received an EHT capabilities element that includes support for that triggered TXOP sharing mode (e.g., support subfield set to 01, 10, or 11). The EHT capabilities element is described herein with reference to FIG. 3.

Additionally, or alternatively, the first wireless device 205 may receive the frame 230 as part of an association procedure performed with the second wireless device 210-a, the association procedure including establishment of communications between the first wireless device 205 and the second wireless device 210-a. In some cases, the first wireless device 205 may communicate with the second wireless device 210-a during operations of the triggered TXOP sharing mode 215-a prior to receiving the frame 230. Alternatively, or additionally, the second wireless device 210-a may disable one or more particular triggered TXOP sharing modes 215 after association, and keep the modes disabled at all times (e.g., before performing a triggered TXOP sharing procedure).

In some cases, in accordance with the frame 230, the first wireless device 205 may transmit a frame 235 (e.g., a control message frame, a data frame, a management frame) that triggers a P2P transmission by the second wireless device 210-a with the second wireless device 210-b (e.g., a STA, an XR device) during a TXOP sharing duration. In some other examples, the frame 235 may trigger an uplink MU data transmission by the second wireless device 210-a with the first wireless device 205 during the TXOP sharing duration. In this way, the second wireless device 210-a may communicate with the first wireless device 205 or a peer STA, such as the second wireless device 210-b, based on the capability of the second wireless device 210-a to support such communications.

In some examples, the first wireless device 205 may transmit the frame to share a TXOP the first wireless device 205 obtained with the second wireless device 210-a (e.g., a client). In some examples, the frame may indicate which access category (AC) traffic, traffic type, traffic identifier (TID), Stream Classification Service Identifier (SCSID), or any combination thereof, may be associated with communications with the second wireless device 210-a. For example, the frame 235 may be an MU-RTS TXS Trigger frame that indicates an AC, a TID, or both, which the second wireless device 210-a may require to transmit traffic (e.g., in accordance with the supported triggered TXOP sharing modes 215) that belongs to that AC, TID, SCSID, or any combination thereof. In some examples, the AC, the TID, the SCSID, or any combination thereof may be included in a user information (e.g., User Info) field, a common information (e.g., Common Info) field, or both, which may be included in the MU RTS TXS Trigger frame.

To support an operation indication for a triggered TXOP sharing procedure, the first wireless device 205 may receive a frame 240 (e.g., a control message frame, a data frame, a management frame) from the second wireless device 210-a. The frame 240 may indicate a first change mode request that identifies a change in support for the triggered TXOP sharing mode 215-a (or a change in support for two or more triggered TXOP sharing modes 215). For example, the change may respectively indicate to suspend, resume, enable, or disable the support for each of the one or more triggered TXOP sharing modes, such as the triggered TXOP sharing mode 215-a. For example, after an association procedure between the first wireless device 205 and the second wireless device 210-a, and in some cases, during operation of the triggered TXOP sharing mode 215-a, the second wireless device 210-a may indicate to disable support (e.g., operation) of the triggered TXOP sharing mode 215-a, such that the triggered TXOP sharing mode 215-a is deactivated. In this way, given that the frame 230 indicated a capability of the second wireless device 210-a to support particular triggered TXOP sharing modes 215, the second wireless device 210-a may transmit the frame 240 indicating to operate using one or more of the supported triggered TXOP sharing modes 215.

In some examples, as described herein, the second wireless device 210-a may indicate to operate using one of four triggered TXOP sharing modes 215. For example, the frame 240 may indicate that operations of a first TXOP sharing mode (e.g., Mode 0) unsupported by the second wireless device 210-a. That is, the frame 230 may indicate that the second wireless device 210-a is capable of supporting both triggered uplink SU transmissions to the first wireless device 205 and triggered P2P transmissions to the second wireless device 210-b, however the frame 240 may indicate to disable operations using either the triggered uplink SU transmissions or the triggered P2P transmissions. For example, if the second wireless device 210-a prefers to receive uplink MU transmissions from one or more non-AP STAs, the second wireless device 210-a may use the first mode (e.g., Mode 0) such that the first wireless device 205 refrains scheduling uplink SU transmissions or P2P transmissions for the second wireless device 210-a.

Based on the frame 240, the second wireless device 210-a may receive a frame 245 (e.g., a trigger frame, a data frame, a control frame, a management frame) from the first wireless device 205. The frame 245 may trigger a data transmission by the second wireless device 210-*a* during a TXOP sharing duration in accordance with the triggered TXOP sharing mode 215-*a* or the triggered TXOP sharing mode 215-*b*. For example, if the frame 240 indicates an activation of the triggered TXOP sharing mode 215-*a*, the second wireless device 210-*a* may communicate with the first wireless device 205 according to the triggered TXOP sharing mode 215-*a* during the TXOP sharing duration. If the frame 240 indicates a suspension of the triggered TXOP sharing mode 215-*a*, and an activation of the triggered TXOP sharing mode 215-*b*, the second wireless device 210-*a* may communicate according to the triggered TXOP sharing mode 215-*b* during the TXOP sharing duration. In this way, the second wireless device 210-*a* may communicate with the first wireless device 205 during the TXOP sharing duration in accordance with the triggered TXOP sharing mode 215-*a* or the triggered TXOP sharing mode 215-*b*.

In some examples, the frame 240 may indicate a time of a time offset associated with disablement, enablement, suspension, or resumption of the support for the triggered TXOP sharing mode 215-*a*. For example, the frame 240 may indicate to suspend the support for the triggered TXOP sharing mode 215-*a*. In some examples, the frame 240 may indicate that the triggered TXOP sharing mode 215-*a* is to be suspended for a particular time period. In some cases, the second wireless device 210-*a* may transmit an additional frame (e.g., a third frame) indicating a second change mode request that identifies to resume the support for the triggered TXOP sharing mode 215-*a*, for example, after the particular time period, or at a given time. In some examples, the TXOP sharing duration during which the second wireless device 210-*a* may communicate in accordance with the triggered TXOP sharing mode 215-*a* may be based on the defined time interval the triggered TXOP sharing mode 215-*a* was suspended for. For example, the frame 240 may indicate suspension of the support for the triggered TXOP sharing mode 215-*a* for a defined time interval (after which the support for the triggered TXOP sharing mode 215-*a* is resumed), where the TXOP sharing duration may occur subsequent to (e.g., after) the defined time interval.

Alternatively, the frame 240 may indicate to activate support for a second triggered TXOP sharing mode (e.g., Mode 1), which may include only triggered uplink SU transmissions to the first wireless device 205. As such, the first wireless device 205 may refrain from scheduling MU transmissions for the second wireless device 210-*a*, and instead may schedule the triggered uplink SU transmissions to the first wireless device 205. In some examples, if the second wireless device 210-*a* is capable of supporting triggered P2P transmissions only, the frame 240 may indicate to activate operations in a third triggered TXOP sharing mode (e.g., Mode 2), which may activate only the triggered P2P transmissions for the second wireless device 210-*a*. In this way, the first wireless device 205 may refrain from scheduling uplink SU or MU transmissions for the second wireless device 210-*a*, and may instead schedule the triggered P2P transmissions between the second wireless device 210-*a* and one or more peer STAs or non-AP STAs (e.g., the second wireless device 210-*b*). Alternatively, based on the second wireless device 210-*a* having a capability to support both triggered uplink SU transmissions to the first wireless device 205 and triggered P2P transmissions with other STAs, the frame 240 may indicate to enable operations for both types of transmissions.

In some cases, the frame 240 may include a link identifier of a link to which the change of the operation of the triggered TXOP sharing mode 215-*a* applies. For example, the frame 240 may include a link indication (e.g., link identifier) to indicate that the triggered TXOP sharing mode 215 is suspended on a particular link (e.g., a communication link 220, a P2P link 225). In addition, the frame 240 may include a MAC frame, a management frame, or a control frame, which is described herein with reference to FIG. 4.

In some examples, to avoid potential frame loss (e.g., based on failing to support or operate according to a triggered TXOP sharing mode 215 during the TXOP sharing duration), the second wireless device 210-*a* may continue using a current operating channel width, active receive chains, and active transmit chains with PPDUs based on the active triggered TXOP sharing mode 215. The second wireless device 210-*a* may refrain from suspending the PPDUs until the second wireless device 210-*a* infers that the first wireless device 205 has processed the frame 240 (e.g., the requested operation). In this way, the second wireless device 210-*a* may transmit one or more PPDUs using one or more receive chains, one or more transmit chains, and an operating width associated with the triggered TXOP sharing mode 215-*a*, and the second wireless device 210-*a* may suspend transmissions of the one or more PPDUs based on receiving the frame 240.

In some cases, the first wireless device 205 and the second wireless device 210-*a* may support the capability and operation indications as described herein, where the first wireless device 205 may be a first AP and the second wireless device 210-*a* may be a second AP. For example, the second wireless device 210-*a* may transmit a frame 230 to the first wireless device 205 indicating to activate support for an additional triggered TXOP sharing mode (e.g., other than Mode 1, Mode 2, or Mode 3). Then, the first wireless device 205 may transmit an MU-RTS TXS trigger frame indicating support and activation of the additional triggered TXOP sharing mode, which may enable communications specifically between the two APs (e.g., P2P communications between the first wireless device 205 and the second wireless device 210-*a*), which may support improved AP-to-AP communications. In some examples, the additional triggered TXOP sharing mode may be a new mode (e.g., Mode 4, Mode 5), and support for the additional triggered TXOP sharing mode may be activated, deactivated, suspended, or resumed as described herein.

Figure 3:
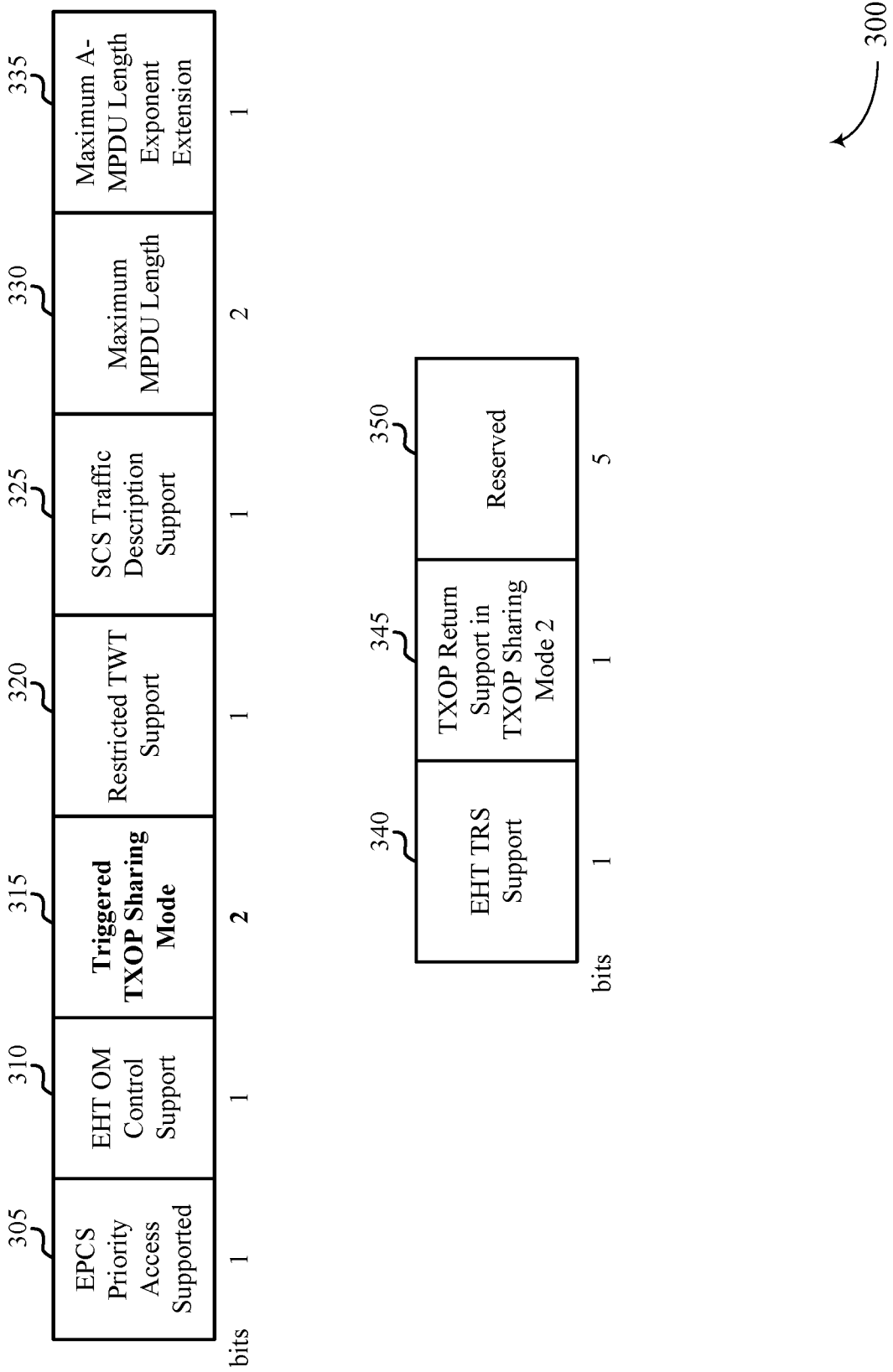
FIGS. 3 and 4 illustrate examples of field formats that support dynamic selection of triggered TXOP sharing modes in accordance with one or more aspects of the present disclosure.

FIG. 3 illustrates an example of a field format 300 that supports dynamic selection of triggered transmission opportunity sharing modes in accordance with one or more aspects of the present disclosure. In some examples, the field format 300 may implement aspects of the wireless communications systems 100 and 200 or may be implemented by aspects of the wireless communications systems 100 and 200. For example, a wireless device (e.g., a STA, an AP) may transmit a capability message including the field format 300 to indicate which triggered TXOP sharing modes the wireless device supports (e.g., has a capability to support).

As described herein, a first wireless device (e.g., an AP or a STA) and a second wireless device (e.g., an AP or a STA) may support a capability indication for the triggered TXOP sharing procedure. The second wireless device may transmit a capability message indicating that the second wireless device supports a first triggered TXOP sharing mode of a set of triggered TXOP sharing modes. In some examples, the second wireless device may indicate which triggered TXOP sharing modes it supports by setting one or more corresponding bits to 1 in an EHT MAC capabilities element it transmits in the capability message. The EHT MAC capabilities element (e.g., an EHT MAC capabilities information field) may be represented by the field format 300.

To support the capability indication, the field format may include a field 315 that includes two bits indicating which triggered TXOP sharing modes the second wireless device, the first wireless device, or both support. That is, the second wireless device may transmit a set of bits (e.g., two bits) in the field 315 of the capability message indicating that the second wireless device supports the first triggered TXOP sharing mode (e.g., of a set of four possible triggered TXOP sharing modes described herein). In some examples, a first bit of the field 315 may indicate support for triggered uplink SU transmissions, and a second bit of the field 315 may indicate support for triggered P2P transmissions.

If both bits of the field 315 have a value of zero (e.g., 00), the field 315 may indicate that both triggered uplink SU transmissions and triggered P2P transmissions are unsupported by the second wireless device. If the first bit of the field 315 has a value of zero and the second bit of the field 315 has a value of one (e.g., 01), the field 315 may indicate that the second wireless devices supports triggered uplink SU transmissions to the first wireless device. If the first bit has a value of one and the second bit has a value of zero (e.g., 10), the field 315 may indicate that the second wireless device supports triggered P2P transmissions. If both bits of the field 315 have a value of 1 (e.g., 11), the field 315 may indicate that the second wireless device supports both the triggered uplink SU transmissions to the first wireless device and the P2P transmissions. In this way, the second wireless device may redefine the field 315 in the EHT capabilities element to indicate one of the four triggered TXOP sharing modes described herein rather than using additional reserved bits (e.g., in a field 350).

The field format 300 may include a field 305 of one bit that may indicate whether emergency preparedness communication service (EPCS) priority access is supported (e.g., a bit value of 1 may indicate that the EPCS priority access is supported, a bit value of 0 may indicate that the EPCS priority access is not supported). In addition, the field format 300 may include a field 310 of one bit that may indicate EHT Operating mode (OM) control support (e.g., a bit value of 1 may indicate that the EHT OM control is supported, a bit value of 0 may indicate that the EHT OM control is not supported). Additionally, or alternatively, the field format may include a field 320 of one bit indicating whether a restricted TWT is supported (e.g., a bit value of 1 may indicate that the restricted TWT is supported, a bit value of 0 may indicate that the restricted TWT is not supported). The field format 300 may include a field 325 of one bit that indicates whether a stream classification service (SCS) traffic description is supported (e.g., a bit value of 1 may indicate that the SCS traffic description is supported, a bit value of 0 may indicate that the SCS traffic description is not supported).

In some examples, the field format 300 may additionally include a field 330 of two bits that may indicate a maximum MAC protocol data unit (MPDU) length. For example, if the two bits have a value of 1, the maximum MPDU length may be equal to two bits. Additionally, or alternatively, the field format 300 may include a field 335 include a one-bit maximum aggregate MPDU (A-MPDU) length exponent extension (e.g., a bit value of 1 may extend the length of the A-MPDU, a bit value of 0 may not extend the length of the A-MPDU). In some examples, the field format 300 may include a bit 340 that includes one bit indicating support for EHT triggered response scheduling (TRS) (e.g., a bit value of 1 may indicate that the EHT TRS triggered response scheduling is supported, a bit value of 0 may indicate that the EHT TRS triggered response scheduling is not supported).

In some examples, the field format 300 may include a bit 345 of one bit that may indicate TXOP return support in a TXOP sharing Mode 2 (e.g., a bit value of 1 may indicate support for the TXOP return, a bit value of 0 may indicate that the TXOP return is unsupported). Additionally, or alternatively, the field format may include a field 350 that includes five reserved bits.

Figure 4:
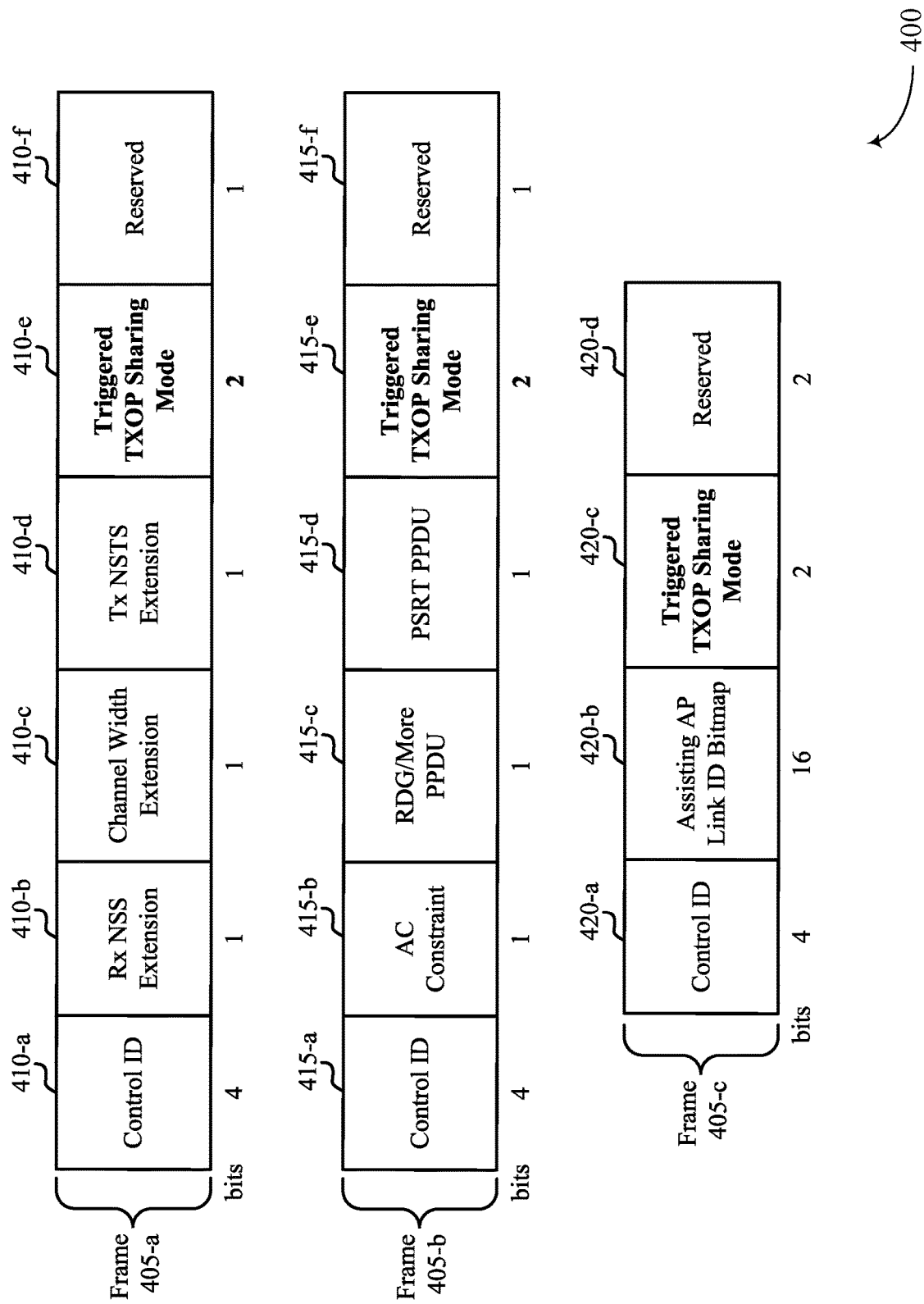

FIG. 4 illustrates an example of a field format 400 that supports dynamic selection of triggered transmission opportunity sharing modes in accordance with one or more aspects of the present disclosure. In some examples, the field format 400 may implement aspects of the wireless communications systems 100 and 200 or may be implemented by aspects of the wireless communications systems 100 and 200. For example, a wireless device (e.g., a STA, an AP) may transmit a capability message including the field format 400 to indicate which triggered TXOP sharing modes the wireless device supports (e.g., has a capability to support). In some examples, the field format 400 may include a frame 405-$a$, a frame 405-$b$, a frame 405-$c$, or any combination thereof.

As described herein, a first wireless device (e.g., an AP or a STA) and a second wireless device (e.g., an AP or a STA) may support an operation indication for the triggered TXOP sharing procedure. The second wireless device may transmit a first frame to the first wireless device indicating a first change mode request, which may identify a change (e.g., suspension, resumption, enablement, or disablement) of support for one or more triggered TXOP sharing modes. In some examples, the first frame may include a MAC frame, a management frame (e.g., including subcarrier spacing request fields, TWT request fields, new action fields, suspension fields, among other fields), a control frame, or any combination thereof.

In some examples, the first frame may include the MAC frame, which may be a frame 405-$a$, a frame 405-$b$, or a frame 405-$c$. The MAC frame may be a MAC frame header that includes a control field indicating the change of support for the one or more triggered TXOP sharing modes. For example, the MAC frame may include a high-efficiency (HE) variant high-throughput (HT) control field (e.g., an aggregated control (A-control) subfield), which may include a set of EHT or HE OM control fields (e.g., the frame 405-$a$), a set of CAS control fields (e.g., the frame 405-$b$), or a set of AAR control fields (e.g., the frame 405-$c$), among other types of control fields.

In some examples, the frame 405-$a$ may include a MAC frame header of a set of fields 410, including a field 410-$e$ (e.g., a control field of a set of fields 410). The field 410-$e$ may indicate the change in the support for a first triggered TXOP sharing mode. The field 410-$e$ may include two bits indicating the change in support for a given triggered TXOP sharing mode of a set of four possible triggered TXOP sharing modes. In some examples, a first bit of the field 410-$e$ may indicate support for triggered uplink SU transmissions, and a second bit of the field 410-$e$ may indicate support for triggered P2P transmissions.

If both bits of the field 410-$e$ have a value of zero (e.g., 00), the field 410-$e$ may indicate that both triggered uplink SU transmissions and triggered P2P transmissions are unsupported by the second wireless device. If the first bit of the field 410-$e$ has a value of zero and the second bit of the field 410-$e$ has a value of one (e.g., 01), the field 410-$e$ may indicate that the second wireless devices supports triggered uplink SU transmissions to the first wireless device. If the first bit has a value of one and the second bit has a value of zero (e.g., 10), the field 410-$e$ may indicate that the second wireless device supports triggered P2P transmissions. If both bits of the field 410-*e* have a value of 1 (e.g., 11), the field 410-*e* may indicate that the second wireless device supports both the triggered uplink SU transmissions to the first wireless device and the P2P transmissions. In this way, the second wireless device may redefine the field 410-*e* in the EHT capabilities element to indicate one of the four triggered TXOP sharing modes described herein rather than using additional reserved bits (e.g., in a field 410-*f*).

In addition to the field 410-*e*, the frame 405-*a* may include a field 410-*a* of four bits that may indicate a control identifier (ID), a field 410-*b* of one bit indicating a one-bit receive number of spatial streams (NSS) extension (e.g., Rx NSS extension), a field 410-*c* of one bit indicating a one-bit channel width extension, a field 410-*d* of one bit indicating a one-bit transmit number of total space time streams (NSTS) extension (e.g., Tx NSTS extension), and the field 410-*f* of one reserved bit. It should be noted that the fields 410 described herein is not an exhaustive list of all fields 410 that may be included in the frame 405-*b*. That is, the frame 405-*a* may support newly added fields to support dynamic selection and changing of support for triggered TXOP sharing mode as described herein.

In some examples, the frame 405-*b* may include a field 415-*e* (e.g., a control field of a set of fields 415), which may indicate the change in the support for the first triggered TXOP sharing mode. That is, like the field 410-*e* of the frame 405-*a*, the field 415-*e* may include two bits indicating the change in support for a given triggered TXOP sharing mode of a set of four possible triggered TXOP sharing modes. The first bit of the field 415-*e* may indicate support for triggered uplink SU transmissions, and a second bit of the field 415-*e* may indicate support for triggered P2P transmissions (e.g., bits 00 may correspond to a Mode 0, bits 01 may correspond to a Mode 1, bits 10 may correspond to a Mode 2, and bits 11 may correspond to a Mode 3). In addition to the field 415-*e*, the frame 405-*b* may include a field 415-*a* of four bits that may indicate a control ID, a field 415-*b* of one bit indicating a one-bit AC constraint, a field 415-*c* of one bit indicating a reverse direction grant (RDG) or additional PPDUs, a field 415-*d* of one bit indicating a PSRT PPDU, and a field 415-*f* of one reserved bit. It should be noted that the fields 415 described herein is not an exhaustive list of all fields 415 that may be included in the frame 405-*b*. That is, the frame 405-*b* may support newly added fields to support dynamic selection and changing of support for triggered TXOP sharing mode as described herein.

Additionally, or alternatively, the frame 405-*c* may include a field 420-*c* (e.g., a control field of a set of fields 420), which may indicate the change in the support for the first triggered TXOP sharing mode. That is, like the field 410-*e* of the frame 405-*a*, the field 420-*c* may include two bits indicating the change in support for a given triggered TXOP sharing mode of a set of four possible triggered TXOP sharing modes. The first bit of the field 420-*c* may indicate support for triggered uplink SU transmissions, and a second bit of the field 420-*c* may indicate support for triggered P2P transmissions (e.g., bits 00 may correspond to a Mode 0, bits 01 may correspond to a Mode 1, bits 10 may correspond to a Mode 2, and bits 11 may correspond to a Mode 3). In addition to the field 420-*c*, the frame 405-*c* may include a field 420-*a* of four bits that may indicate a control ID, a field 420-*b* of 16 bits indicating an assisting AP link ID bitmap, and a field 420-*d* of two reserved bits. It should be noted that the fields 420 described herein is not an exhaustive list of all fields 420 that may be included in the frame 405-*c*. That is, the frame 405-*c* may support newly added fields to support dynamic selection and changing of support for triggered TXOP sharing mode as described herein.

Figure 5:
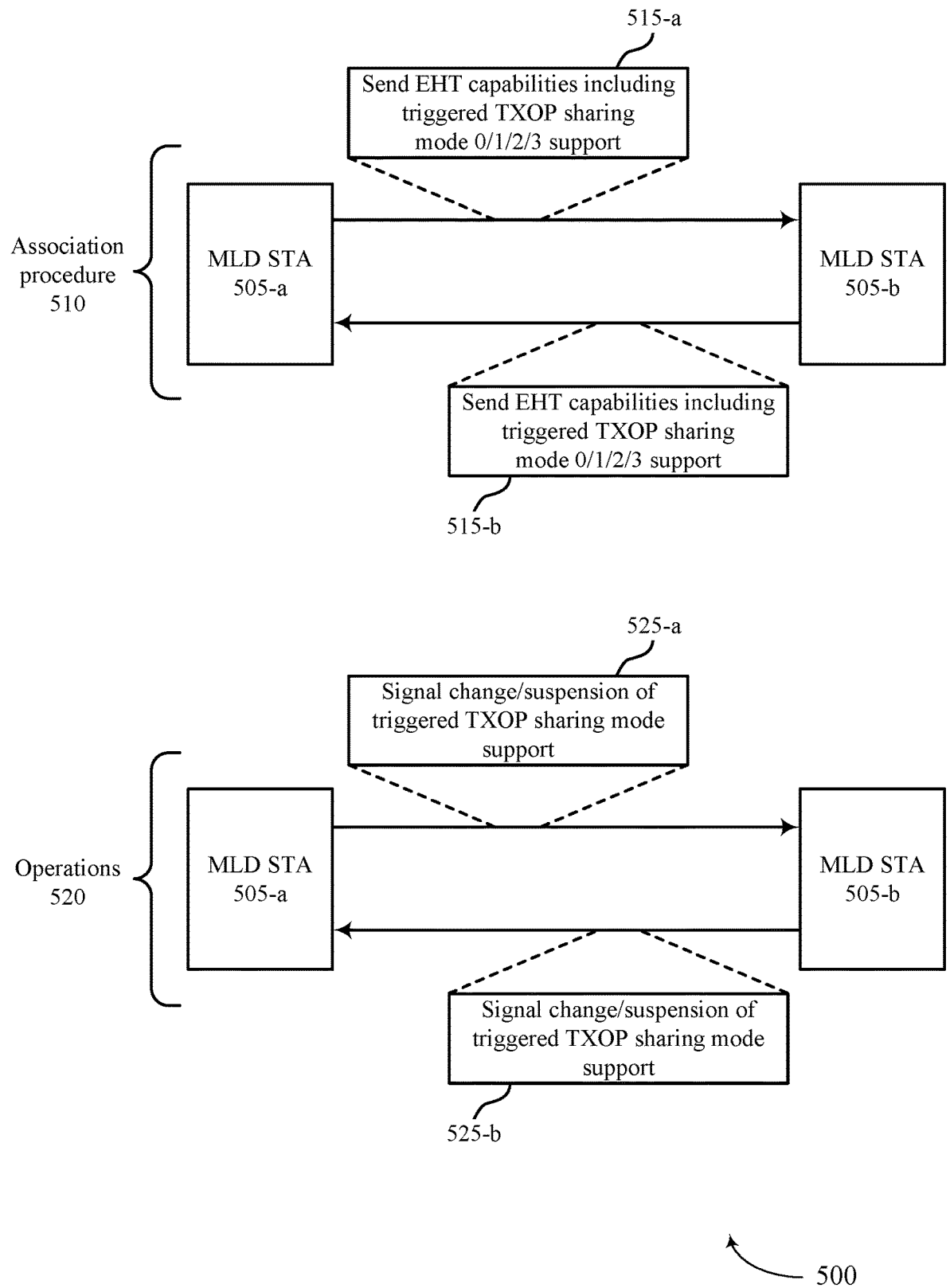
FIG. 5 illustrates an example of a transmission scheme that supports dynamic selection of triggered TXOP sharing modes in accordance with one or more aspects of the present disclosure.

FIG. 5 illustrates an example of a transmission scheme 500 that supports dynamic selection of triggered transmission opportunity sharing modes in accordance with one or more aspects of the present disclosure. In some examples, the transmission scheme 500 may implement aspects of the wireless communications systems 100 and 200 or may be implemented by aspects of the wireless communications systems 100 and 200. For example, a wireless communications system may support wireless devices such as a multi-link device (MLD) STA 505-*a* and an MLD STA 505-*b* (e.g., where a non-AP STA or an AP STA may be affiliated with a non-AP MLD or an AP MLD, respectively), which may communicate using the transmission scheme 500. In some examples, the transmission scheme 500 may include a capability indication, an operation indication, or both as described herein.

In some examples, wireless devices (e.g., Wi-Fi devices) such as STAs 505, APs, and other wireless devices may support multi-link operation (MLO) according to which the wireless devices may communicate via multiple different links. For example, an AP MLD may communicate with a non-AP MLD via a 2.4 GHz link, a 5 GHz link, a 6 GHz link, or any combination thereof. In some systems, an AP MLD and a non-AP MLD may be capable of communication via other radio frequency links, such as 3.5 GHz, 45 GHz, or 60 GHz links, which may provide relatively higher data rates, a cleaner (such as less crowded) operating channel, or greater link diversity. Communication devices (e.g., MLDs) in a WLAN may use multiple radio frequency links to communicate with each other. MLDs may communicate using a first radio frequency link (e.g., sub7 frequency band) or a second radio frequency link (e.g., 3.5 GHz, 45 GHz, or 60 GHz frequency band). The second radio frequency link (e.g., a 3.5 GHz link, a 45 GHz link, or a 60 GHz link) may provide a large available spectrum for communications in a WLAN (e.g., Wi-Fi). Some WLANs may support MLO in which the MLDs may communicate over multiple frequency ranges. For example, MLDs in a WLAN may communicate over one or more sub7 radio frequency links (e.g., 6 GHz, 5 GHz, 2.4 GHz) in addition to over high radio frequency link (e.g., a 3.5 GHz link, a 45 GHz link, or a 60 GHz link).

In some cases of MLO between MLDs such as the MLD STAs 505, the MLD STA 505-*a* and the MLD STA 505-*b* may perform an association procedure 510 to establish communications between the MLD STAs 505 and any APs in a same wireless communications system. During the association procedure 510, the MLD STA 505-*a* may transmit a frame 515-*a* indicating EHT capabilities to the MLD STA 505-*b*, the frame 515-*a* indicating which triggered TXOP sharing modes (e.g., Mode 0, 1, 2, or 3 as described herein) the MLD STA 505-*a* supports. Additionally, or alternatively, during the association procedure 510, the MLD STA 505-*b* may transmit a frame 515-*b* indicating corresponding EHT capabilities to the MLD STA 505-*a*, the frame 515-*b* indicating which of the triggered TXOP sharing modes the MLD STA 505-*b* supports.

After the association procedure 510, the MLD STA 505-*a* and the MLD STA 505-*b* may communicate using one or more operations 520 (e.g., in an operations phase). For example, the MLD STAs 505 may communicate using a first triggered TXOP sharing mode. In some other examples, the MLD STA 505 may initially communicate without using a triggered TXOP sharing mode (e.g., before any triggered TXOP sharing modes are enabled). That is, the MLD STA 505-*a* and the MLD STA 505-*b* may support operating according to one or more of the triggered TXOP sharing modes indicated as being supported in the frames 515. In some examples, during the operations 520, the MLD STA 505-*a* may transmit a frame 525-*a* indicating a change of support for the one or more triggered TXOP sharing modes supported by the MLD STA 505. For example, the frame 525-*a* may indicate to suspend, resume, enable, or disable support (e.g., operations) for one or more triggered TXOP sharing mode. Additionally, or alternatively, during the operations 520, the MLD STA 505-*b* may transmit a frame 525-*b* indicating a change of support for the one or more triggered TXOP sharing modes supported by the MLD STA 505-*b*. For example, the frame 525-*b* may indicate to suspend, resume, enable, or disable support (e.g., operations) for the one or more triggered TXOP sharing modes. In this way, the MLD STAs 505 may support the frames 515 including capability indications and the frames 525 indicating operations indications, which may enable the MLD STAs 505 to change support for one or more triggered TXOP sharing modes and improve communications between the wireless devices.

Figure 6:
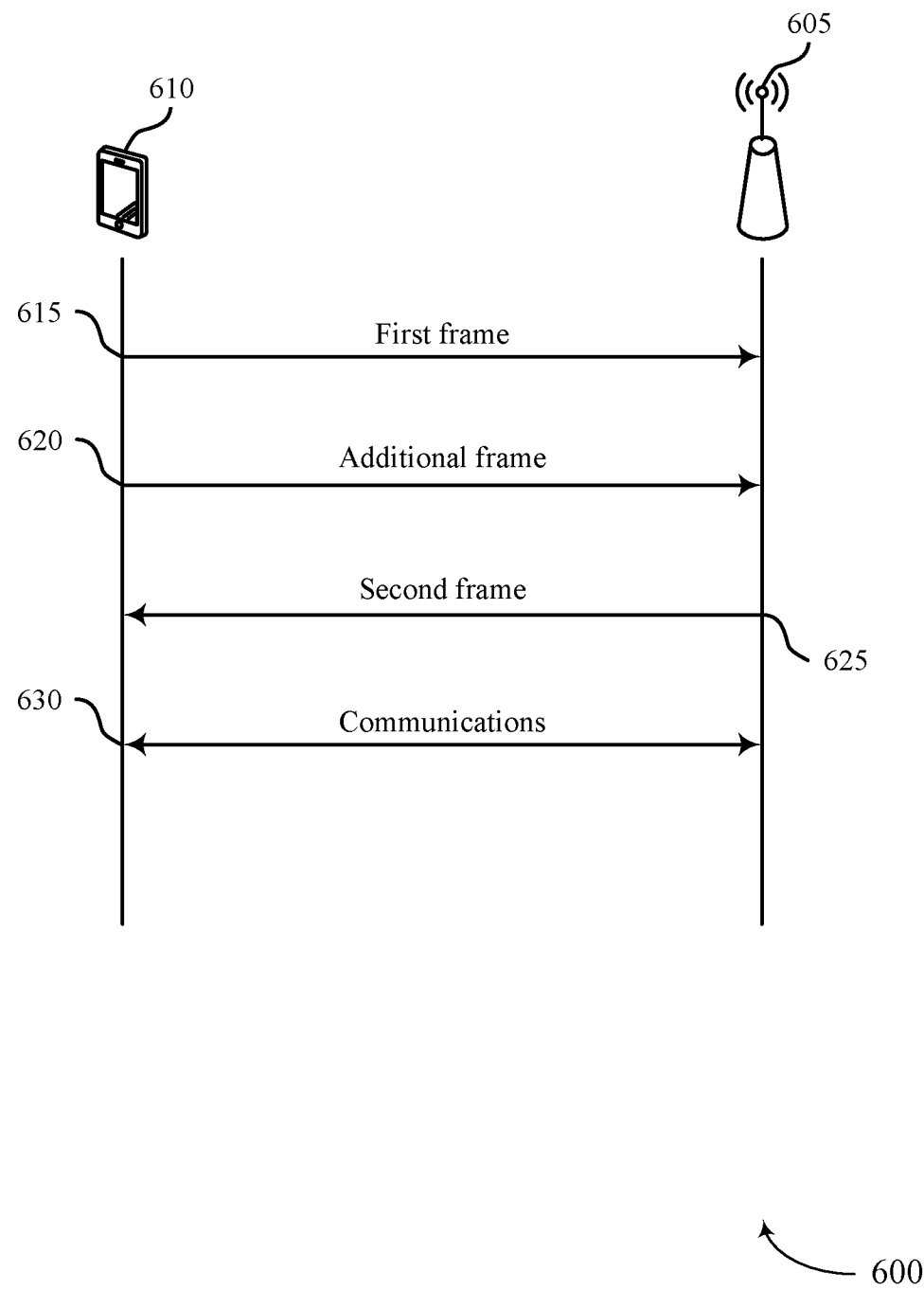
FIGS. 6 and 7 illustrate examples of process flows that support dynamic selection of triggered TXOP sharing modes in accordance with one or more aspects of the present disclosure.

FIG. 6 illustrates an example of a process flow 600 that supports dynamic selection of triggered transmission opportunity sharing modes in accordance with one or more aspects of the present disclosure. The process flow 600 may implement aspects of wireless communications systems 100 and 200, or may be implemented by aspects of the wireless communications system 100 and 200. For example, the process flow 600 may illustrate operations between a first wireless device 605 (e.g., an AP, a STA) and a second wireless device 610 (e.g., an AP, a STA), which may be examples of corresponding devices described herein. In some examples, the first wireless device 605 may be a first AP and the second wireless device 610 may be a second AP, or the second wireless device 610 may be associated with an MLD (e.g., an AP MLD STA, a non-AP MLD STA). In the following description of the process flow 600, the operations between the first wireless device 605 and the second wireless device 610 may be transmitted in a different order than the example order shown, or the operations performed by the first wireless device 605 and the second wireless device 610 may be performed in different orders or at different times. Some operations may also be omitted from the process flow 600, and other operations may be added to the process flow 600.

At 615, the first wireless device 605 may receive, from the second wireless device 610, a first frame indicating a first change mode request that identifies a change in support for a first triggered TXOP sharing mode, the change indicating to suspend, resume, enable, or disable the support for the first triggered TXOP sharing mode. In some examples, the first frame may include a link identifier for a link to which the change may apply. Additionally, or alternatively, the first frame may indicate a time or a time offset at which the change may apply (e.g., a time at which to resume the first triggered TXOP sharing mode). In some examples, the first frame may indicate the change for multiple triggered TXOP sharing modes. In some cases, a given triggered TXOP sharing mode may apply until the second wireless device 610 transmits another frame indicating another change in support of the triggered TXOP sharing mode.

At 620, the first wireless device 605 may receive, from the second wireless device 610, an additional frame indicating a second change mode request that identifies a change in support for the first triggered TXOP sharing mode or a second triggered TXOP sharing mode. For example, the additional frame may indicate to resume the first triggered TXOP sharing mode at a given time if the first frame indicated to suspend the first triggered TXOP sharing mode.

At 625, the first wireless device 605 may transmit, to the second wireless device 610 and based on the first frame, a second frame that triggers a data transmission by the second wireless device 610 during a TXOP sharing duration in accordance with the first triggered TXOP sharing mode or a second triggered TXOP sharing mode. The TXOP sharing duration may be a period of time in which the first wireless device 605 may share an obtained TXOP sharing duration with the second wireless device 610. For example, the second frame may include a trigger message that indicates that the second wireless device 610 is to communicate with the first wireless device 605 or an additional wireless device (e.g., a STA or an AP) using a supported triggered TXOP sharing mode as indicated in the first frame.

At 630, the first wireless device 605 may communicate with the second wireless device 610 in accordance with the first triggered TXOP sharing mode or the second triggered TXOP sharing mode. For example, based on one or more changes to the support for one or more triggered TXOP sharing modes, the second wireless device 610 may perform uplink SU transmissions with the first wireless device 605. In some examples, the first wireless device 605 may communicate with the second wireless device 610 during the TXOP sharing duration, which may be a defined time interval during which the wireless devices may operate according to a particular triggered TXOP sharing mode.

Figure 7:
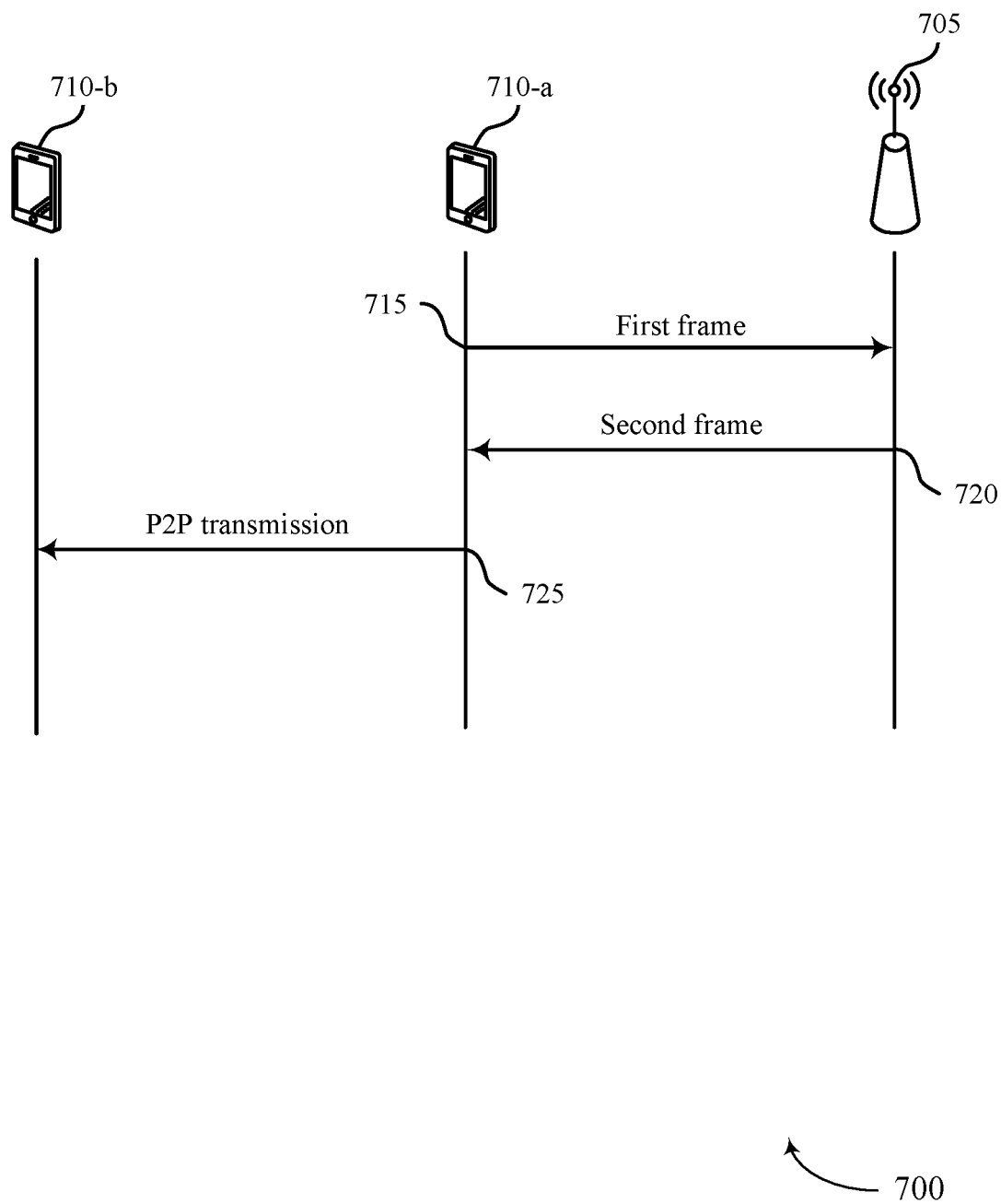

FIG. 7 illustrates an example of a process flow 700 that supports dynamic selection of triggered transmission opportunity sharing modes in accordance with one or more aspects of the present disclosure. The process flow 700 may implement aspects of wireless communications systems 100 and 200, or may be implemented by aspects of the wireless communications system 100 and 200. For example, the process flow 700 may illustrate operations between a first wireless device 705 (e.g., an AP, a STA), a second wireless device 710-*a* (e.g., an AP, a STA), and a second wireless device 710-*b* (e.g., a STA, an XR device), which may be examples of corresponding devices described herein. In some examples, the first wireless device 705 may be a first AP and the second wireless device 710-*a* may be a second AP, or the second wireless device 710 may be associated with an MLD (e.g., an AP MLD STA, a non-AP MLD STA). In the following description of the process flow 700, the operations between the first wireless device 705, the second wireless device 710-*a*, and the second wireless device 710-*b* may be transmitted in a different order than the example order shown, or the operations performed by the first wireless device 705, the second wireless device 710-*a*, and the second wireless device 710-*b* may be performed in different orders or at different times. Some operations may also be omitted from the process flow 700, and other operations may be added to the process flow 700.

At 715, the first wireless device 705 may receive, from a second wireless device 710-*a*, a first frame indicating that the second wireless device 710-*a* supports a first triggered TXOP sharing mode of a set of multiple different triggered TXOP sharing mode, the first triggered TXOP sharing mode indicating that the second wireless device 710-*a* only supports triggered P2P transmissions. That is, the first frame may indicate a capability of the second wireless device 710-*b* to support only triggered P2P transmissions (e.g., a Mode 2), instead of uplink SU transmissions, uplink MU transmissions, or other transmissions. In some examples, the first wireless device 705 may receive the first frame as a part of an association procedure performed with the second wireless device 710-*a*.

At 720, the first wireless device 705 may transmit, in accordance with the first frame, a second frame that triggers a P2P transmission by the second wireless device 710-*a* during a TXOP sharing duration. The TXOP sharing duration may be a period of time in which the first wireless device 705 may share an obtained TXOP sharing duration with the second wireless device 710-*a*. That is, based on the second wireless device 710-*a* indicating a capability to support the triggered P2P transmissions in the first frame, the first wireless device 705 may schedule such triggered P2P transmissions for the second wireless device 710-*a*.

At 725, the second wireless device 710-*a* may transmit, in accordance with the second frame, the P2P transmissions with the second wireless device 710-*b*. For example, the second wireless device 710-*a* may communicate triggered P2P transmissions via a P2P link, where the second wireless device 710-*b* may be a non-AP STA, such as an XR wireless device. In some examples, the second wireless device 710-*a* may transmit the triggered P2P transmissions during the TXOP sharing duration.

Figure 8:
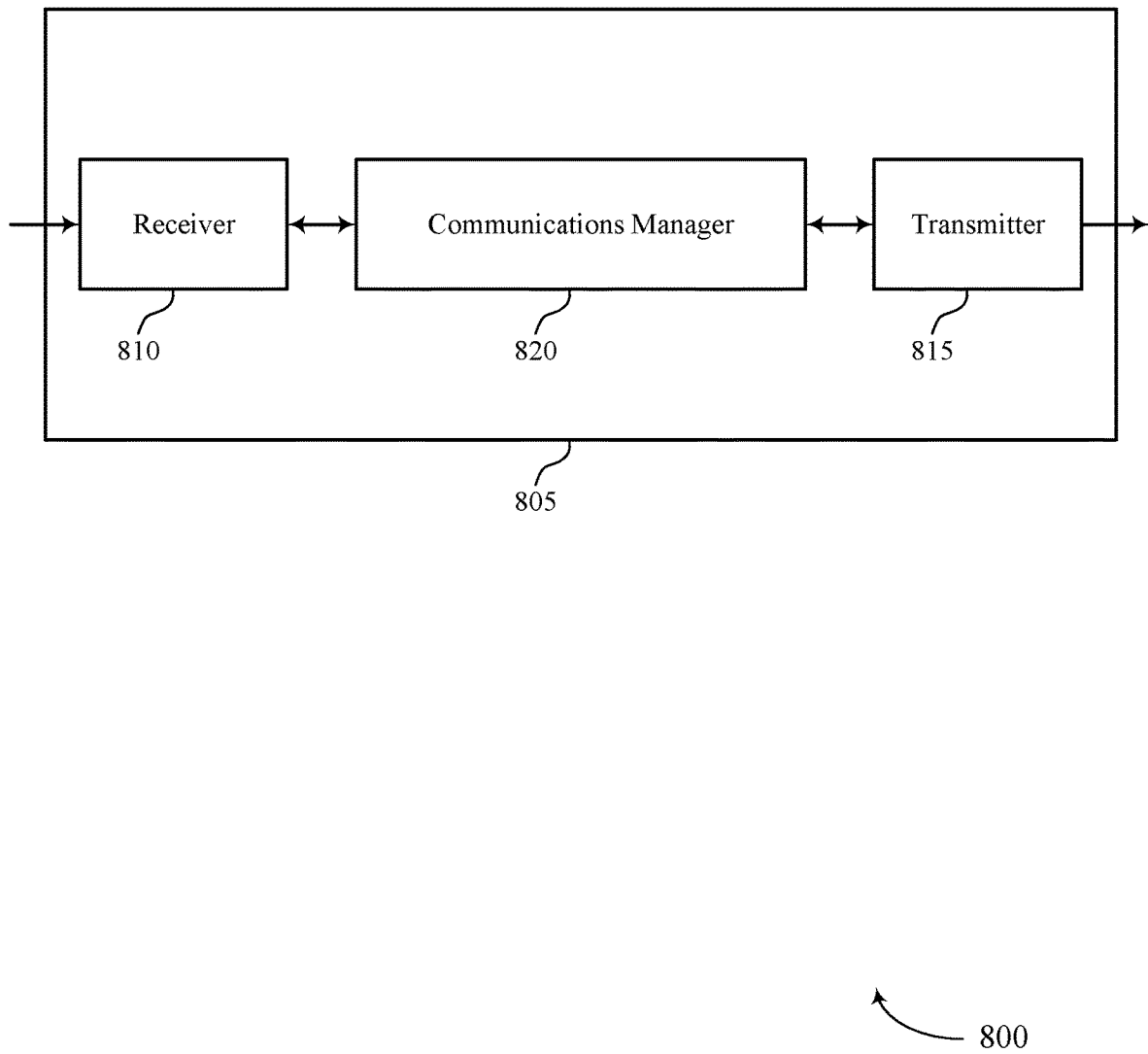
FIGS. 8 and 9 show block diagrams of devices that support dynamic selection of triggered TXOP sharing modes in accordance with one or more aspects of the present disclosure.

FIG. 8 shows a block diagram 800 of a device 805 that supports dynamic selection of triggered TXOP sharing modes in accordance with one or more aspects of the present disclosure. The device 805 may be an example of aspects of a first wireless device as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to dynamic selection of triggered TXOP sharing modes). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to dynamic selection of triggered TXOP sharing modes). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of dynamic selection of triggered TXOP sharing modes as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first wireless device in accordance with examples as disclosed herein. For example, the communications manager 820 may be configured as or otherwise support a means for receiving, from a second wireless device, a first frame indicating a first change mode request that identifies a change in support for a first triggered TXOP sharing mode, the change indicating to suspend, resume, enable, or disable the support for the first triggered TXOP sharing mode. The communications manager 820 may be configured as or otherwise support a means for transmitting, based on the first frame, a second frame that triggers a data transmission by the second wireless device during a TXOP sharing duration in accordance with the first triggered TXOP sharing mode or a second triggered TXOP sharing mode.

Additionally, or alternatively, the communications manager 820 may support wireless communications at a first wireless device in accordance with examples as disclosed herein. For example, the communications manager 820 may be configured as or otherwise support a means for receiving, from a second wireless device, a first frame indicating that the second wireless device supports a first triggered TXOP sharing mode of a set of multiple different TXOP sharing modes, the first triggered TXOP sharing mode indicating that the second wireless device only supports triggered P2P transmission. The communications manager 820 may be configured as or otherwise support a means for transmitting, in accordance with the first frame, a second frame that triggers a P2P transmission by the second wireless device during a TXOP sharing duration.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for dynamic selection of triggered TXOP sharing modes, which may increase signaling throughput, decrease latency, and improve a quality of wireless communications.

Figure 9:
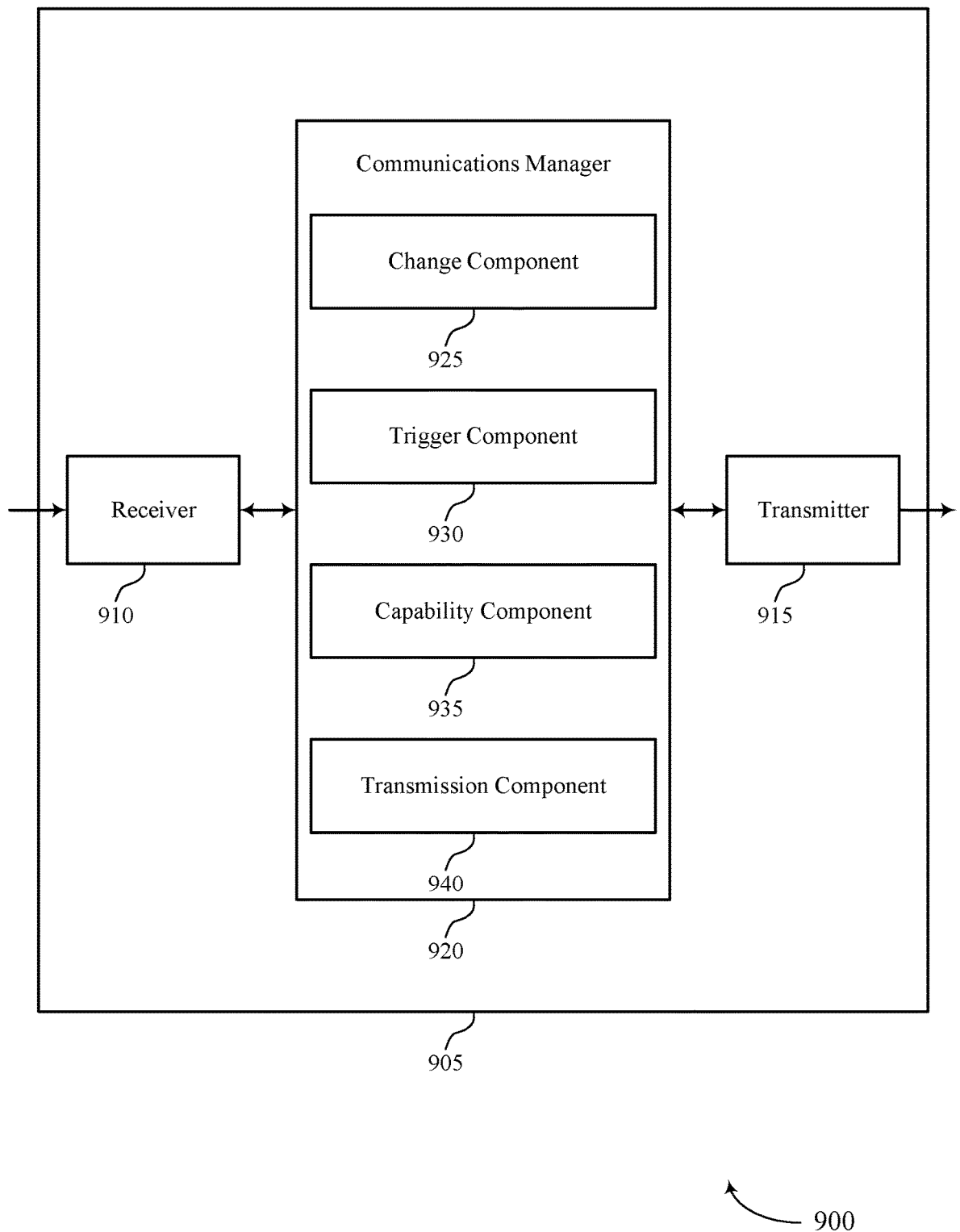

FIG. 9 shows a block diagram 900 of a device 905 that supports dynamic selection of triggered TXOP sharing modes in accordance with one or more aspects of the present disclosure. The device 905 may be an example of aspects of a device 805 or a first wireless device 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to dynamic selection of triggered TXOP sharing modes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to dynamic selection of triggered TXOP sharing modes). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of dynamic selection of triggered TXOP sharing modes as described herein. For example, the communications manager 920 may include a change component 925, a trigger component 930, a capability component 935, a transmission component 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first wireless device in accordance with examples as disclosed herein. The change component 925 may be configured as or otherwise support a means for receiving, from a second wireless device, a first frame indicating a first change mode request that identifies a change in support for a first triggered TXOP sharing mode, the change indicating to suspend, resume, enable, or disable the support for the first triggered TXOP sharing mode. The trigger component 930 may be configured as or otherwise support a means for transmitting, based on the first frame, a second frame that triggers a data transmission by the second wireless device during a TXOP sharing duration in accordance with the first triggered TXOP sharing mode or a second triggered TXOP sharing mode.

Additionally, or alternatively, the communications manager 920 may support wireless communications at a first wireless device in accordance with examples as disclosed herein. The capability component 935 may be configured as or otherwise support a means for receiving, from a second wireless device, a first frame indicating that the second wireless device supports a first triggered TXOP sharing mode of a set of multiple different TXOP sharing modes, the first triggered TXOP sharing mode indicating that the second wireless device only supports triggered P2P transmission. The transmission component 940 may be configured as or otherwise support a means for transmitting, in accordance with the first frame, a second frame that triggers a P2P transmission by the second wireless device during a TXOP sharing duration.

Figure 10:
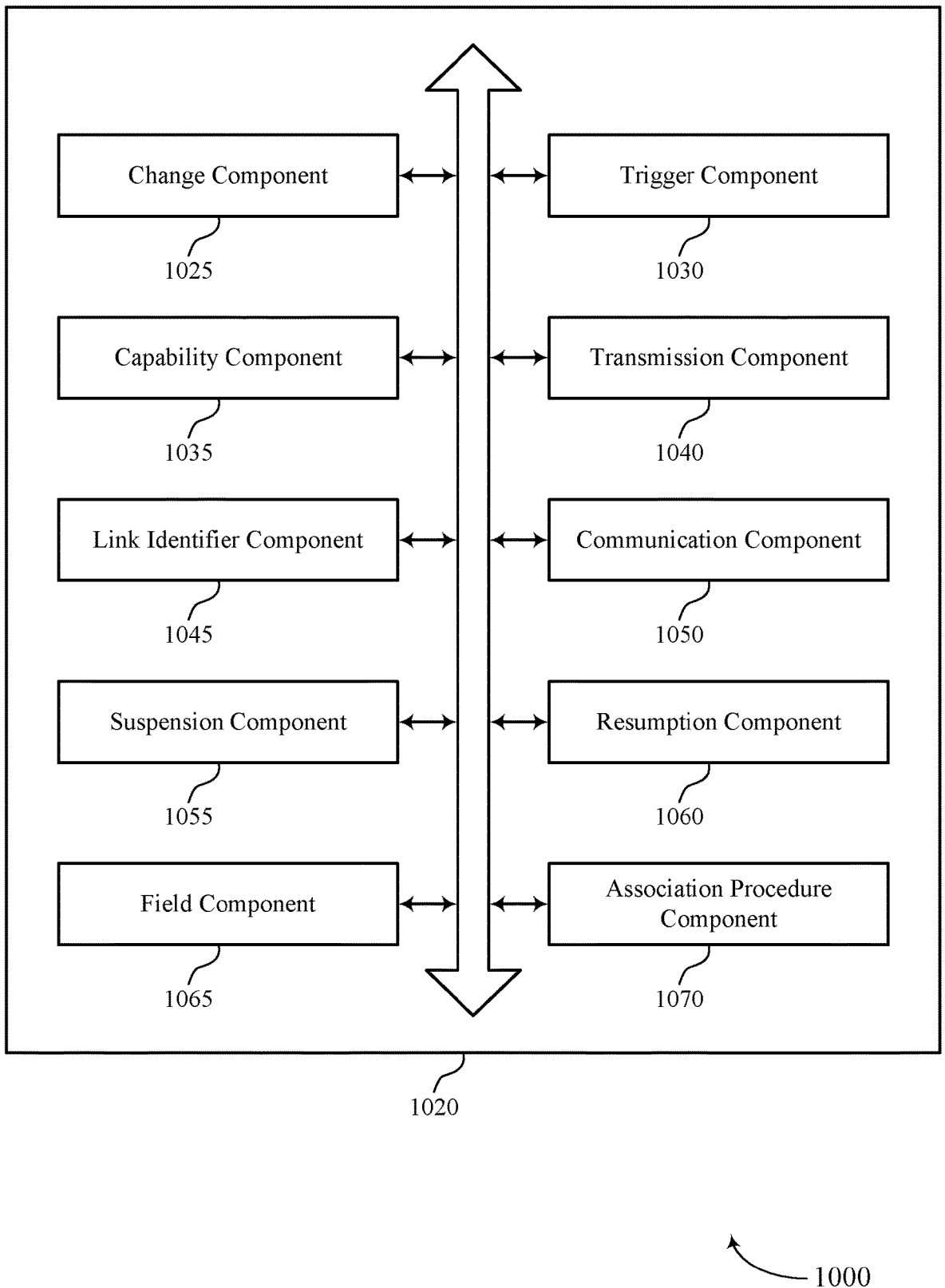
FIG. 10 shows a block diagram of a communications manager that supports dynamic selection of triggered TXOP sharing modes in accordance with one or more aspects of the present disclosure.

FIG. 10 shows a block diagram 1000 of a communications manager 1020 that supports dynamic selection of triggered TXOP sharing modes in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of dynamic selection of triggered TXOP sharing modes as described herein. For example, the communications manager 1020 may include a change component 1025, a trigger component 1030, a capability component 1035, a transmission component 1040, a link identifier component 1045, a communication component 1050, a suspension component 1055, a resumption component 1060, a field component 1065, an association procedure component 1070, or any combination thereof. Each of these components may communicate, directly or indirectly, with one another (e.g., via one or more buses).

The communications manager 1020 may support wireless communications at a first wireless device in accordance with examples as disclosed herein. The change component 1025 may be configured as or otherwise support a means for receiving, from a second wireless device, a first frame indicating a first change mode request that identifies a change in support for a first triggered TXOP sharing mode, the change indicating to suspend, resume, enable, or disable the support for the first triggered TXOP sharing mode. The trigger component 1030 may be configured as or otherwise support a means for transmitting, based on the first frame, a second frame that triggers a data transmission by the second wireless device during a TXOP sharing duration in accordance with the first triggered TXOP sharing mode or a second triggered TXOP sharing mode.

In some examples, the first frame includes a link identifier of a link to which the change in the support for the first triggered TXOP sharing mode applies. In some examples, the first frame indicates a time or a time offset associated with disablement, enablement, suspension, or resumption of the support for the first triggered TXOP sharing mode.

In some examples, the communication component 1050 may be configured as or otherwise support a means for communicating with the second wireless device in accordance with the first triggered TXOP sharing mode or the second triggered TXOP sharing mode.

In some examples, the first frame indicates to suspend, resume, enable, or disable the support for the second triggered TXOP sharing mode or a third triggered TXOP sharing mode.

In some examples, the first frame indicates the first change mode request that identifies to suspend the support for the first triggered TXOP sharing mode. In some examples, the resumption component 1060 may be configured as or otherwise support a means for receiving, from the second wireless device, a third frame indicating a second change mode request that identifies to resume the support for the first triggered TXOP sharing mode.

In some examples, the first frame indicates the first change mode request that identifies the change in support for the first triggered TXOP sharing mode for a defined time interval. In some examples, the change component 1025 may be configured as or otherwise support a means for transmitting the second frame that triggers the data transmission by the second wireless device during the TXOP sharing duration that occurs subsequent to the defined time interval in accordance with the first triggered TXOP sharing mode or the second triggered TXOP sharing mode.

In some examples, the first frame is a MAC frame including a MAC frame header that includes a control field indicating the change in the support for the first triggered TXOP sharing mode. In some examples, first frame is a management frame indicating the change in the support for the first triggered TXOP sharing mode. In some examples, the first frame is a control frame indicating the change in the support for the first triggered TXOP sharing mode.

In some examples, the change component 1025 may be configured as or otherwise support a means for communicating with the second wireless device during operation of the first triggered TXOP sharing mode prior to receiving the first frame.

In some examples, the first triggered TXOP sharing mode indicates that triggered uplink SU transmissions and that triggered P2P transmissions are both unsupported by the first wireless device, indicates that the triggered uplink SU transmissions are supported by the first wireless device, indicates that the triggered P2P transmissions are supported by the first wireless device, or indicates that the triggered uplink SU transmissions and the triggered P2P transmissions are both supported by the first wireless device. In some examples, the first wireless device is an AP or a STA, and where the second wireless device is an AP or a STA. In some examples, the first wireless device is affiliated with an MLD.

Additionally, or alternatively, the communications manager 1020 may support wireless communications at a first wireless device in accordance with examples as disclosed herein. The capability component 1035 may be configured as or otherwise support a means for receiving, from a second wireless device, a first frame indicating that the second wireless device supports a first triggered TXOP sharing mode of a set of multiple different TXOP sharing modes, the first triggered TXOP sharing mode indicating that the second wireless device only supports triggered P2P transmission. The transmission component 1040 may be configured as or otherwise support a means for transmitting, in accordance with the first frame, a second frame that triggers a P2P transmission by the second wireless device during a TXOP sharing duration.

In some examples, to support receiving the first frame, the field component 1065 may be configured as or otherwise support a means for receiving a set of bits in a field of the first frame indicating that the second wireless device supports the first triggered TXOP sharing mode of the set of multiple different TXOP sharing modes.

In some examples, to support receiving the first frame, the association procedure component 1070 may be configured as or otherwise support a means for receiving the first frame as part of an association procedure performed with the second wireless device.

In some examples, the first triggered TXOP sharing mode indicates that triggered uplink SU transmissions and that triggered P2P transmissions are both unsupported by the first wireless device, indicates that the triggered uplink SU transmissions are supported by the first wireless device, indicates that the triggered P2P transmissions are supported by the first wireless device, or indicates that the triggered uplink SU transmissions and the triggered P2P transmissions are both supported by the first wireless device.

In some examples, the first wireless device is an AP or a STA, and where the second wireless device is an AP or a STA. In some examples, the first wireless device is a first AP and the second wireless device is a second AP. In some examples, the second frame indicates an access category, a traffic identifier, or both.

Figure 11:
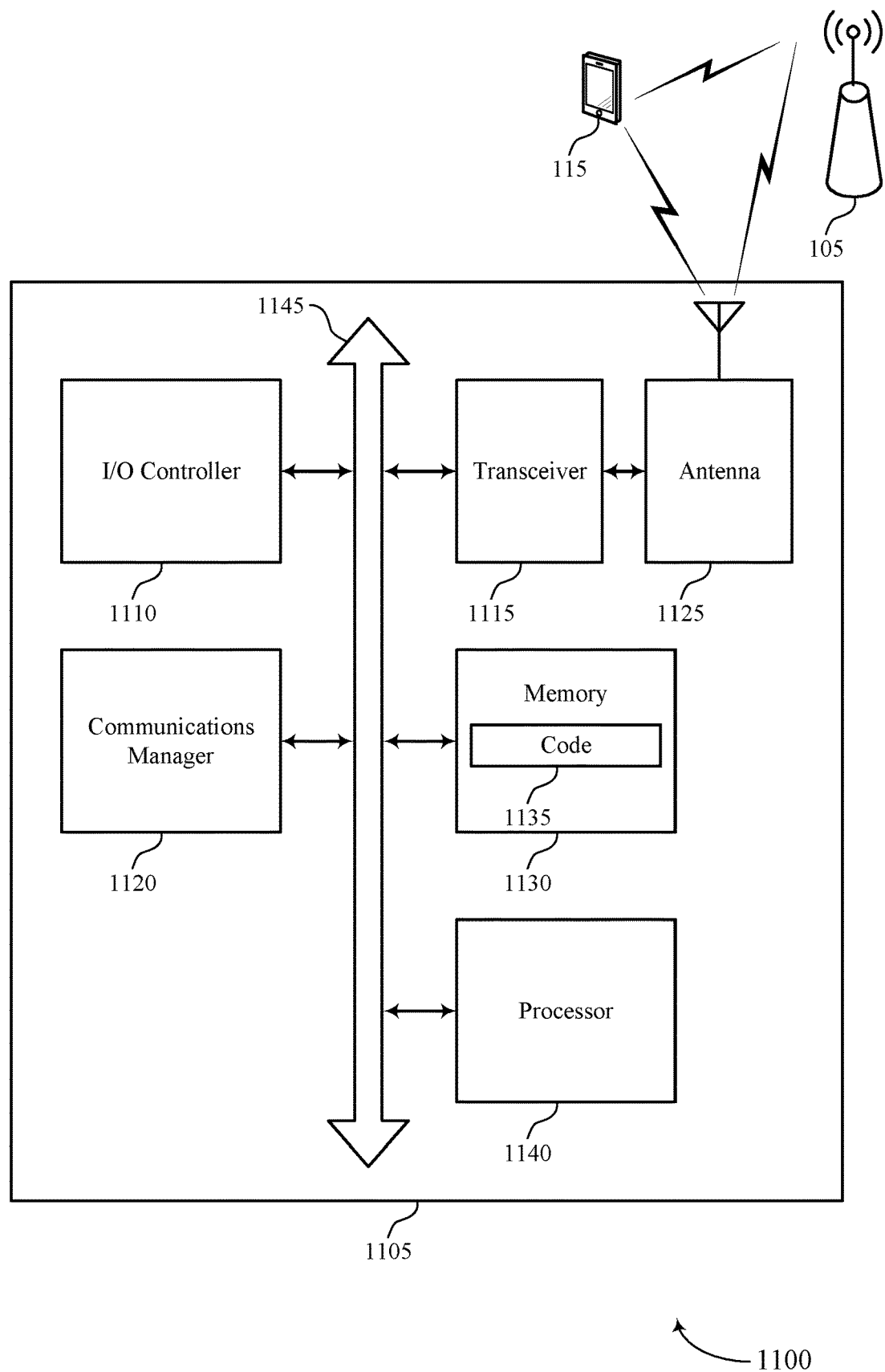
FIG. 11 shows a diagram of a system including a device that supports dynamic selection of triggered TXOP sharing modes in accordance with one or more aspects of the present disclosure.

FIG. 11 shows a diagram of a system 1100 including a device 1105 that supports dynamic selection of triggered TXOP sharing modes in accordance with one or more aspects of the present disclosure. The device 1105 may be an example of or include the components of a device 805, a device 905, or a first wireless device as described herein. The device 1105 may include components for bi-directional voice and data communications including components for transmitting and receiving communications, such as a communications manager 1120, an I/O controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting dynamic selection of triggered TXOP sharing modes). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a first wireless device in accordance with examples as disclosed herein. For example, the communications manager 1120 may be configured as or otherwise support a means for receiving, from a second wireless device, a first frame indicating a first change mode request that identifies a change in support for a first triggered TXOP sharing mode, the change indicating to suspend, resume, enable, or disable the support for the first triggered TXOP sharing mode. The communications manager 1120 may be configured as or otherwise support a means for transmitting, based on the first frame, a second frame that triggers a data transmission by the second wireless device during a TXOP sharing duration in accordance with the first triggered TXOP sharing mode or a second triggered TXOP sharing mode.

Additionally, or alternatively, the communications manager 1120 may support wireless communications at a first wireless device in accordance with examples as disclosed herein. For example, the communications manager 1120 may be configured as or otherwise support a means for receiving, from a second wireless device, a first frame indicating that the second wireless device supports a first triggered TXOP sharing mode of a set of multiple different TXOP sharing modes, the first triggered TXOP sharing mode indicating that the second wireless device only supports triggered P2P transmission. The communications manager 1120 may be configured as or otherwise support a means for transmitting, in accordance with the first frame, a second frame that triggers a P2P transmission by the second wireless device during a TXOP sharing duration.

By including or configuring the communications manager 1120 in accordance with examples as described herein, the device 1105 may support techniques for dynamic selection of triggered TXOP sharing modes, which may increase signaling throughput, decrease latency, and improve a quality of wireless communications.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of dynamic selection of triggered TXOP sharing modes as described herein, or the processor 1140 and the memory 1130 may be otherwise configured to perform or support such operations.

Figure 12:
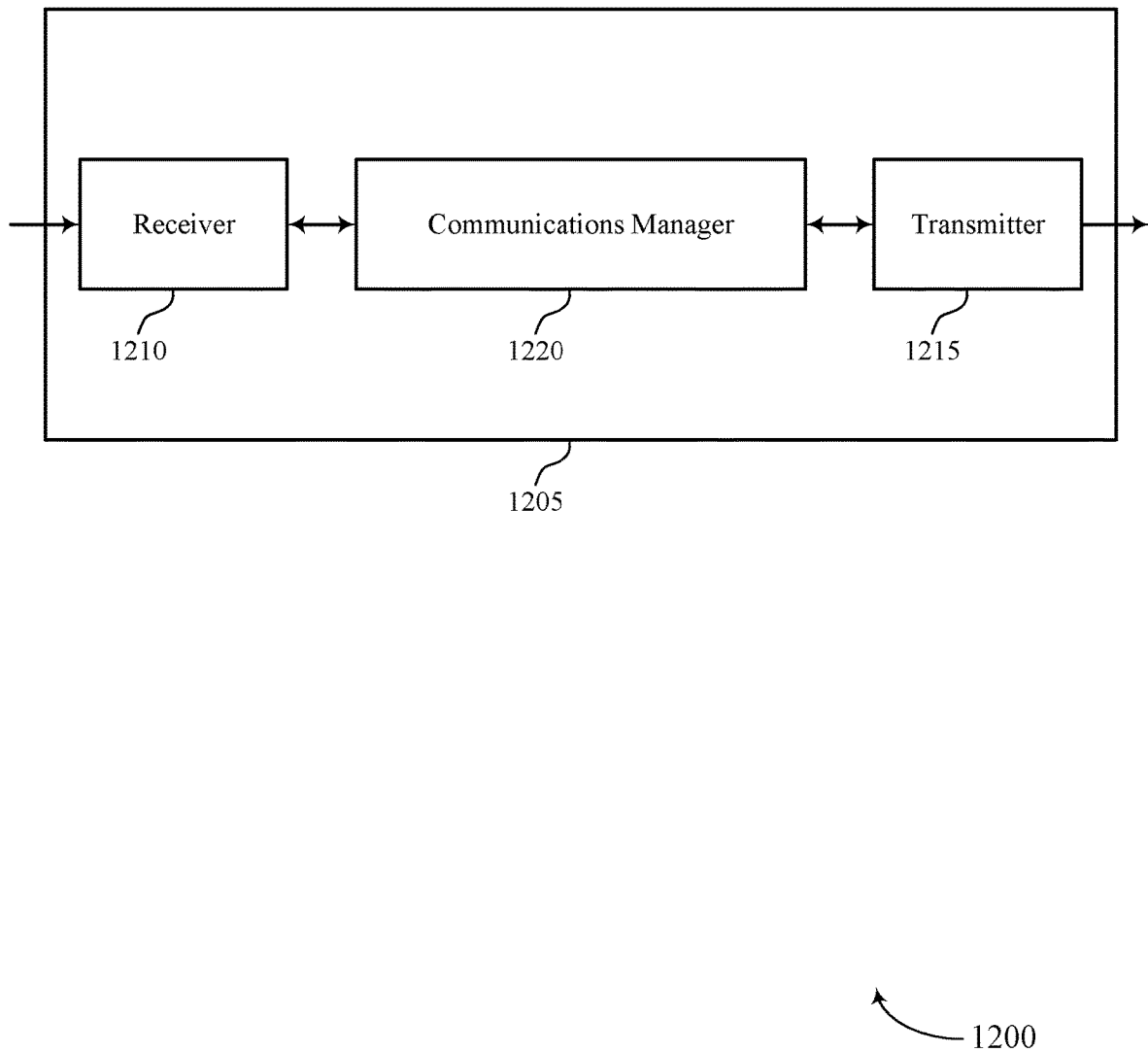
FIGS. 12 and 13 show block diagrams of devices that support dynamic selection of triggered TXOP sharing modes in accordance with one or more aspects of the present disclosure.

FIG. 12 shows a block diagram 1200 of a device 1205 that supports dynamic selection of triggered TXOP sharing modes in accordance with one or more aspects of the present disclosure. The device 1205 may be an example of aspects of a second wireless device as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of dynamic selection of triggered TXOP sharing modes as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a second wireless device in accordance with examples as disclosed herein. For example, the communications manager 1220 may be configured as or otherwise support a means for transmitting, to a first wireless device, a first frame indicating a first change mode request that identifies a change in support for a first triggered TXOP sharing mode, the change indicating to suspend, resume, enable, or disable the support for the first triggered TXOP sharing mode. The communications manager 1220 may be configured as or otherwise support a means for receiving, in accordance with the first frame, a second frame that triggers a data transmission by the second wireless device during a TXOP sharing duration in accordance with the first triggered TXOP sharing mode or a second triggered TXOP sharing mode.

Additionally, or alternatively, the communications manager 1220 may support wireless communications at a second wireless device in accordance with examples as disclosed herein. For example, the communications manager 1220 may be configured as or otherwise support a means for transmitting to a first wireless device, a first frame indicating that the second wireless device supports a first triggered TXOP sharing mode of a set of multiple different triggered TXOP sharing modes, the first triggered TXOP sharing mode indicating that the second wireless device only supports triggered P2P transmission. The communications manager 1220 may be configured as or otherwise support a means for receiving, in accordance with the first frame, a second frame that triggers a P2P transmission by the second wireless device during a TXOP sharing duration. The communications manager 1220 may be configured as or otherwise support a means for transmitting, based on the first frame, the P2P transmission.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for dynamic selection of triggered TXOP sharing modes, which may increase signaling throughput, decrease latency, and improve a quality of wireless communications.

Figure 13:
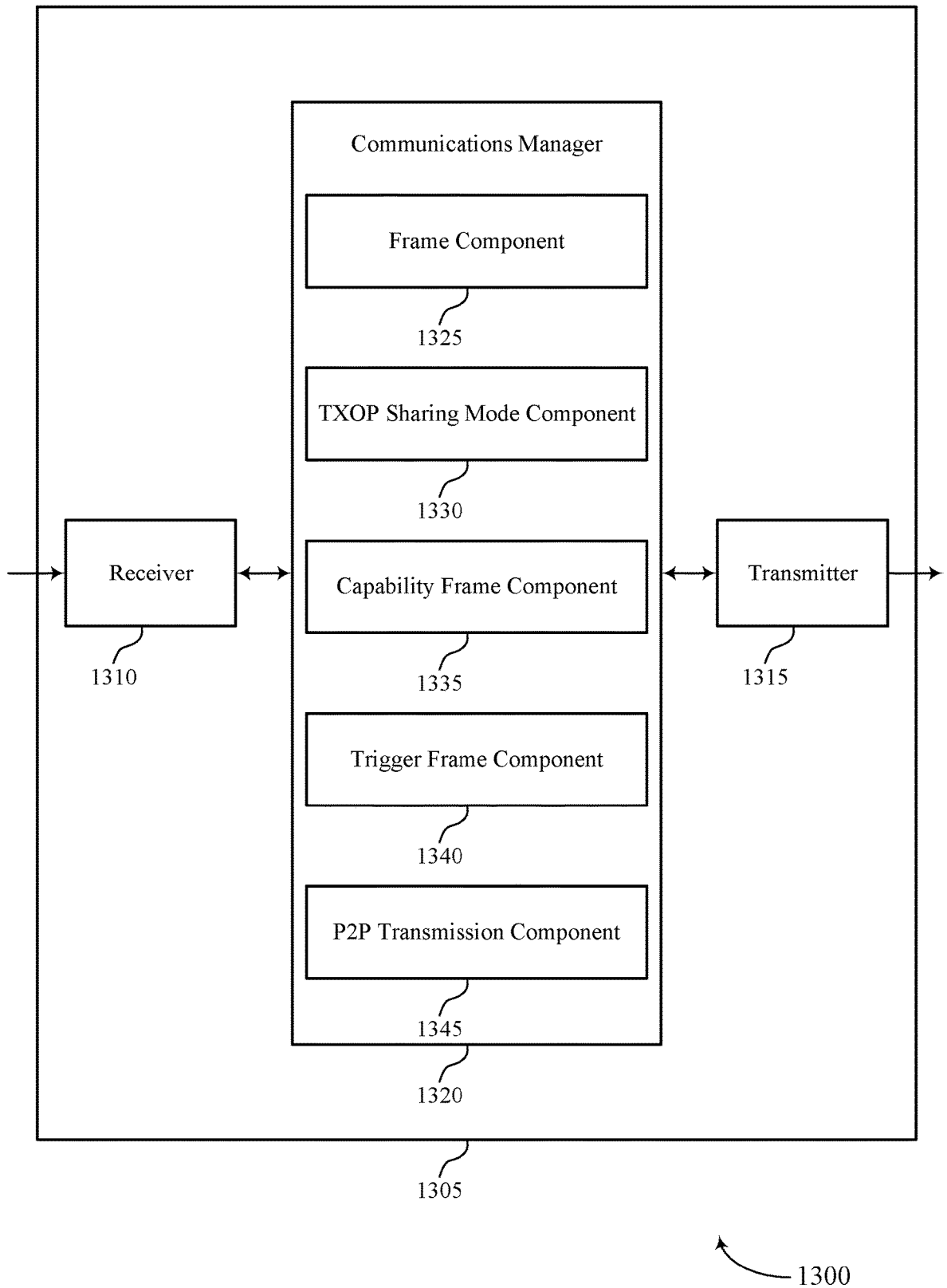

FIG. 13 shows a block diagram 1300 of a device 1305 that supports dynamic selection of triggered TXOP sharing modes in accordance with one or more aspects of the present disclosure. The device 1305 may be an example of aspects of a device 1205 or a second wireless device 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of dynamic selection of triggered TXOP sharing modes as described herein. For example, the communications manager 1320 may include a frame component 1325, a TXOP sharing mode component 1330, a capability frame component 1335, a trigger frame component 1340, a P2P transmission component 1345, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a second wireless device in accordance with examples as disclosed herein. The frame component 1325 may be configured as or otherwise support a means for transmitting, to a first wireless device, a first frame indicating a first change mode request that identifies a change in support for a first triggered TXOP sharing mode, the change indicating to suspend, resume, enable, or disable the support for the first triggered TXOP sharing mode. The TXOP sharing mode component 1330 may be configured as or otherwise support a means for receiving, in accordance with the first frame, a second frame that triggers a data transmission by the second wireless device during a TXOP sharing duration in accordance with the first triggered TXOP sharing mode or a second triggered TXOP sharing mode.

Additionally, or alternatively, the communications manager 1320 may support wireless communications at a second wireless device in accordance with examples as disclosed herein. The capability frame component 1335 may be configured as or otherwise support a means for transmitting to a first wireless device, a first frame indicating that the second wireless device supports a first triggered TXOP sharing mode of a set of multiple different triggered TXOP sharing modes, the first triggered TXOP sharing mode indicating that the second wireless device only supports triggered P2P transmission. The trigger frame component 1340 may be configured as or otherwise support a means for receiving, in accordance with the first frame, a second frame that triggers a P2P transmission by the second wireless device during a TXOP sharing duration. The P2P transmission component 1345 may be configured as or otherwise support a means for transmitting, based on the first frame, the P2P transmission.

Figure 14:
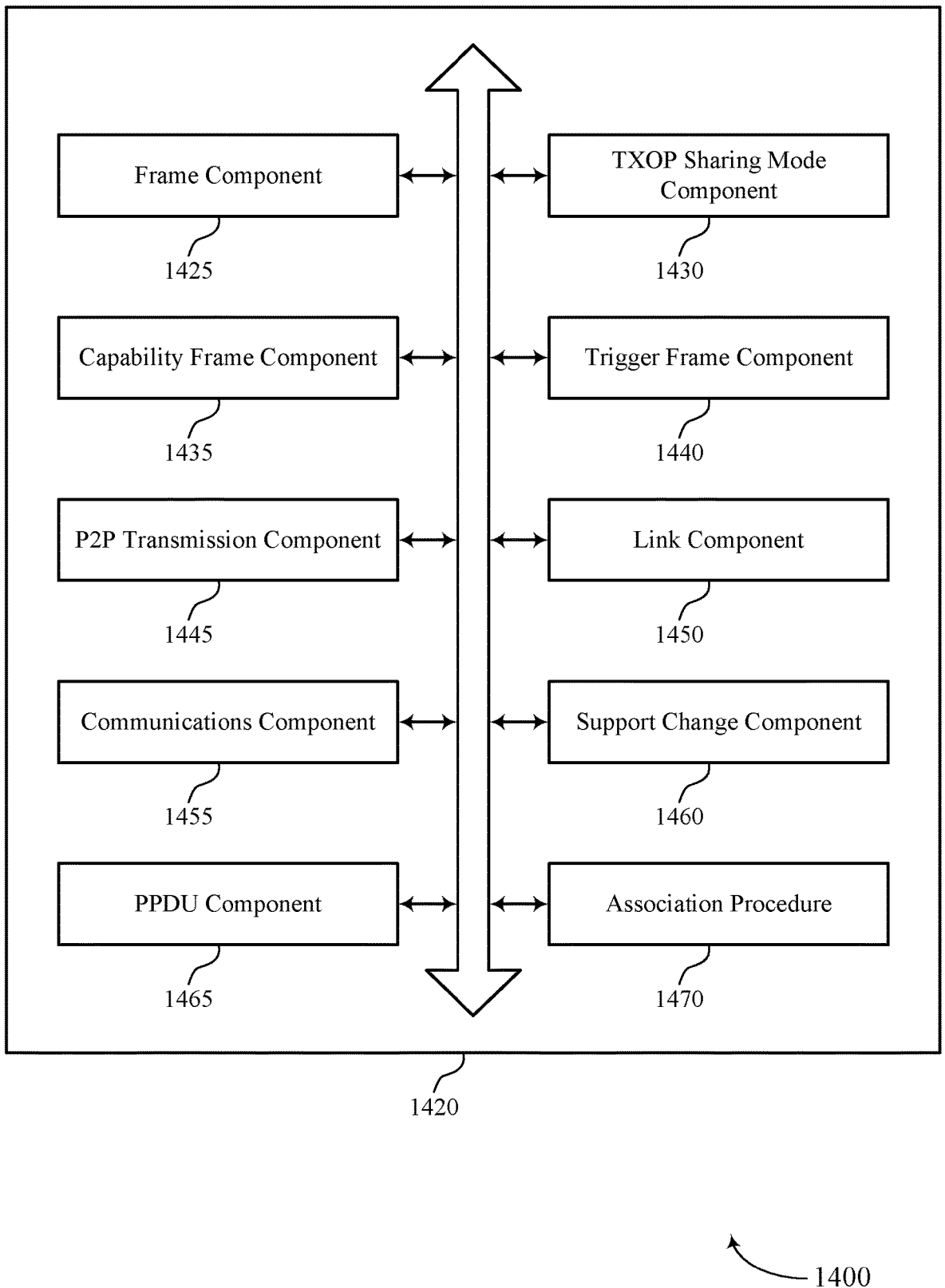
FIG. 14 shows a block diagram of a communications manager that supports dynamic selection of triggered TXOP sharing modes in accordance with one or more aspects of the present disclosure.

FIG. 14 shows a block diagram 1400 of a communications manager 1420 that supports dynamic selection of triggered TXOP sharing modes in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of dynamic selection of triggered TXOP sharing modes as described herein. For example, the communications manager 1420 may include a frame component 1425, a TXOP sharing mode component 1430, a capability frame component 1435, a trigger frame component 1440, a P2P transmission component 1445, a link component 1450, a communications component 1455, a support change component 1460, a PPDU component 1465, an association procedure 1470, or any combination thereof. Each of these components may communicate, directly or indirectly, with one another (e.g., via one or more buses).

The communications manager 1420 may support wireless communications at a second wireless device in accordance with examples as disclosed herein. The frame component 1425 may be configured as or otherwise support a means for transmitting, to a first wireless device, a first frame indicating a first change mode request that identifies a change in support for a first triggered TXOP sharing mode, the change indicating to suspend, resume, enable, or disable the support for the first triggered TXOP sharing mode. The TXOP sharing mode component 1430 may be configured as or otherwise support a means for receiving, in accordance with the first frame, a second frame that triggers a data transmission by the second wireless device during a TXOP sharing duration in accordance with the first triggered TXOP sharing mode or a second triggered TXOP sharing mode.

In some examples, the first frame includes a link identifier of a link to which the change in the support for the first triggered TXOP sharing mode applies. In some examples, the first frame indicates a time or a time offset associated with disablement, enablement, suspension, or resumption of the support for the first triggered TXOP sharing mode.

In some examples, the communications component 1455 may be configured as or otherwise support a means for communicating with the first wireless device in accordance with the first triggered TXOP sharing mode or the second triggered TXOP sharing mode.

In some examples, the first frame indicates to suspend, resume, enable, or disable the support for the second triggered TXOP sharing mode or a third triggered TXOP sharing mode.

In some examples, the first frame indicates to suspend the support for the first triggered TXOP sharing mode. In some examples, the frame component 1425 may be configured as or otherwise support a means for transmitting, to the first wireless device, a third frame indicating a second change mode request that identifies to resume the support for the first triggered TXOP sharing mode.

In some examples, the first frame indicates the change in the support for the first triggered TXOP sharing mode for a defined time interval. In some examples, the support change component 1460 may be configured as or otherwise support a means for receiving the second frame that triggers the data transmission by the second wireless device during the TXOP sharing duration that occurs subsequent to the defined time interval in accordance with the first triggered TXOP sharing mode or the second triggered TXOP sharing mode.

In some examples, the PPDU component 1465 may be configured as or otherwise support a means for transmitting one or more PPDUs using one or more receive chains, one or more transmit chains, and an operating channel width associated with the first triggered TXOP sharing mode. In some examples, the PPDU component 1465 may be configured as or otherwise support a means for suspending transmission of the one or more PPDUs based on receiving the second frame.

In some examples, the first frame is a MAC frame including a MAC frame header that includes a control field indicating the change in the support for the first triggered TXOP sharing mode. In some examples, the first frame is a management frame indicating the change in the support for the first triggered TXOP sharing mode. In some examples, the first frame is a control frame indicating the change in the support for the first triggered TXOP sharing mode.

In some examples, the communications component 1455 may be configured as or otherwise support a means for communicating with the first wireless device during operation of the first triggered TXOP sharing mode prior to transmitting the first frame.

In some examples, the first triggered TXOP sharing mode indicates that triggered uplink SU transmissions and that triggered P2P transmissions are both unsupported by the first wireless device, indicates that the triggered uplink SU transmissions are supported by the first wireless device, indicates that the triggered P2P transmissions are supported by the first wireless device, or indicates that the triggered uplink SU transmissions and the triggered P2P transmissions are both supported by the first wireless device. In some examples, the first wireless device is an AP or a STA, and where the second wireless device is an AP or a STA. In some examples, the second wireless device is affiliated with an MLD.

Additionally, or alternatively, the communications manager 1420 may support wireless communications at a second wireless device in accordance with examples as disclosed herein. The capability frame component 1435 may be configured as or otherwise support a means for transmitting to a first wireless device, a first frame indicating that the second wireless device supports a first triggered TXOP sharing mode of a set of multiple different triggered TXOP sharing modes, the first triggered TXOP sharing mode indicating that the second wireless device only supports triggered P2P transmission. The trigger frame component 1440 may be configured as or otherwise support a means for receiving, in accordance with the first frame, a second frame that triggers a P2P transmission by the second wireless device during a TXOP sharing duration. The P2P transmission component 1445 may be configured as or otherwise support a means for transmitting, based on the first frame, the P2P transmission.

In some examples, to support transmitting the first frame, the capability frame component 1435 may be configured as or otherwise support a means for transmitting a set of bits in a field of the first frame indicating that the second wireless device supports the first triggered TXOP sharing mode of the set of multiple different triggered TXOP sharing modes.

In some examples, to support transmitting the first frame, the association procedure 1470 may be configured as or otherwise support a means for transmitting the first frame as part of an association procedure performed with the first wireless device.

In some examples, the first triggered TXOP sharing mode indicates that triggered uplink SU transmissions and that triggered P2P transmissions are both unsupported by the first wireless device, indicates that the triggered uplink SU transmissions are supported by the first wireless device, indicates that the triggered P2P transmissions are supported by the first wireless device, or indicates that the triggered uplink SU transmissions and the triggered P2P transmissions are both supported by the first wireless device.

In some examples, the first wireless device is an AP or a STA, and where the second wireless device is an AP or a STA. In some examples, the first wireless device is a first AP and the second wireless device is a second AP. In some examples, the second frame indicates an access category, a traffic identifier, or both.

Figure 15:
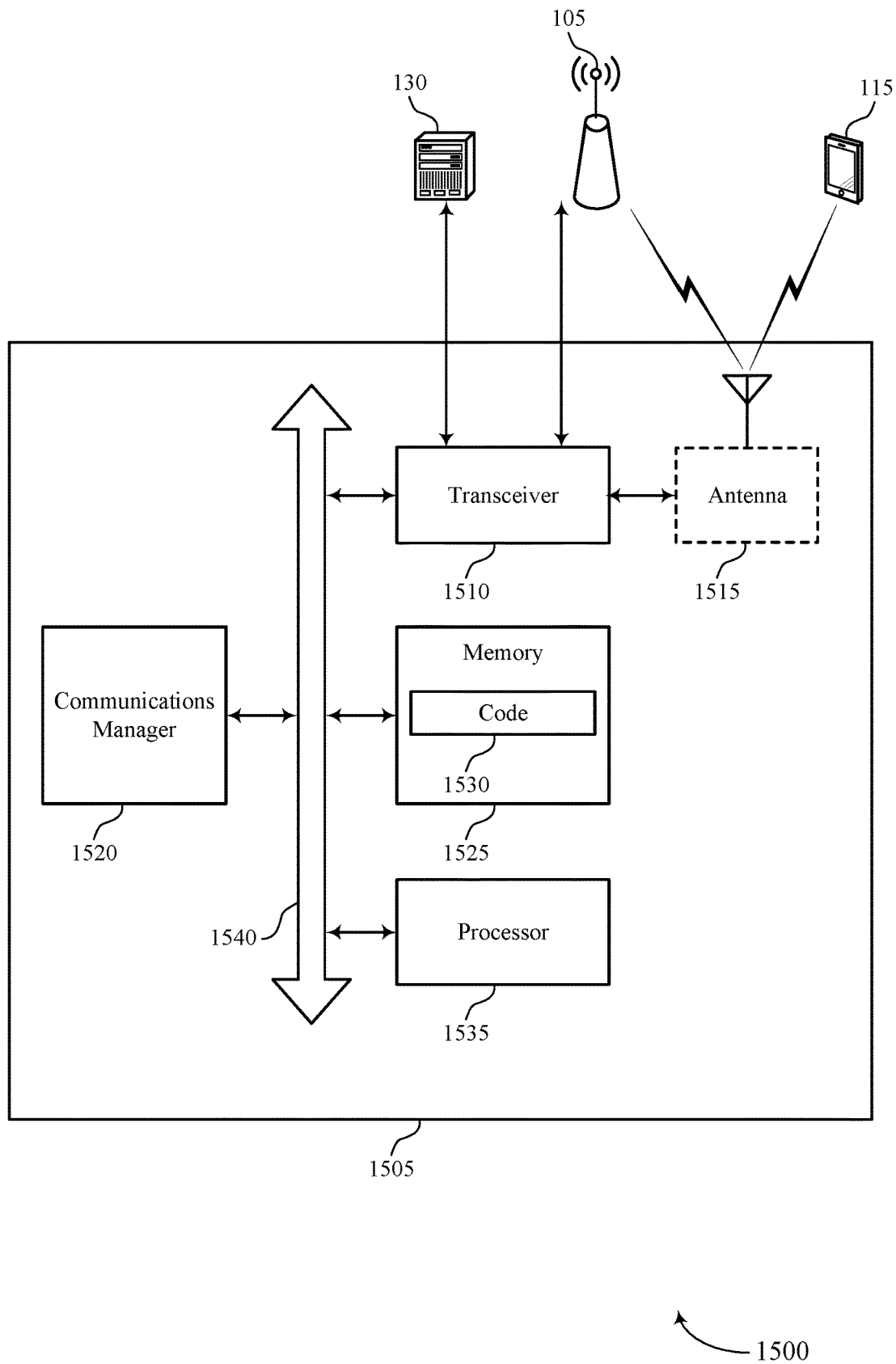
FIG. 15 shows a diagram of a system including a device that supports dynamic selection of triggered TXOP sharing modes in accordance with one or more aspects of the present disclosure.

FIG. 15 shows a diagram of a system 1500 including a device 1505 that supports dynamic selection of triggered TXOP sharing modes in accordance with one or more aspects of the present disclosure. The device 1505 may be an example of or include the components of a device 1205, a device 1305, or a second wireless device as described herein. The device 1505 may include components for bi-directional voice and data communications including components for transmitting and receiving communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link, a fronthaul communication link).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting dynamic selection of triggered TXOP sharing modes). For example, the device 1505 or a component of the device 1505 may include a processor 1535 and memory 1525 coupled with the processor 1535, the processor 1535 and memory 1525 configured to perform various functions described herein.

The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications at a second wireless device in accordance with examples as disclosed herein. For example, the communications manager 1520 may be configured as or otherwise support a means for transmitting, to a first wireless device, a first frame indicating a first change mode request that identifies a change in support for a first triggered TXOP sharing mode, the change indicating to suspend, resume, enable, or disable the support for the first triggered TXOP sharing mode. The communications manager 1520 may be configured as or otherwise support a means for receiving, in accordance with the first frame, a second frame that triggers a data transmission by the second wireless device during a TXOP sharing duration in accordance with the first triggered TXOP sharing mode or a second triggered TXOP sharing mode.

Additionally, or alternatively, the communications manager 1520 may support wireless communications at a second wireless device in accordance with examples as disclosed herein. For example, the communications manager 1520 may be configured as or otherwise support a means for transmitting to a first wireless device, a first frame indicating that the second wireless device supports a first triggered TXOP sharing mode of a set of multiple different triggered TXOP sharing modes, the first triggered TXOP sharing mode indicating that the second wireless device only supports triggered P2P transmission. The communications manager 1520 may be configured as or otherwise support a means for receiving, in accordance with the first frame, a second frame that triggers a P2P transmission by the second wireless device during a TXOP sharing duration. The communications manager 1520 may be configured as or otherwise support a means for transmitting, based on the first frame, the P2P transmission.

By including or configuring the communications manager 1520 in accordance with examples as described herein, the device 1505 may support techniques for dynamic selection of triggered TXOP sharing modes, which may increase signaling throughput, decrease latency, and improve a quality of wireless communications.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of dynamic selection of triggered TXOP sharing modes as described herein, or the processor 1535 and the memory 1525 may be otherwise configured to perform or support such operations.

Figure 16:
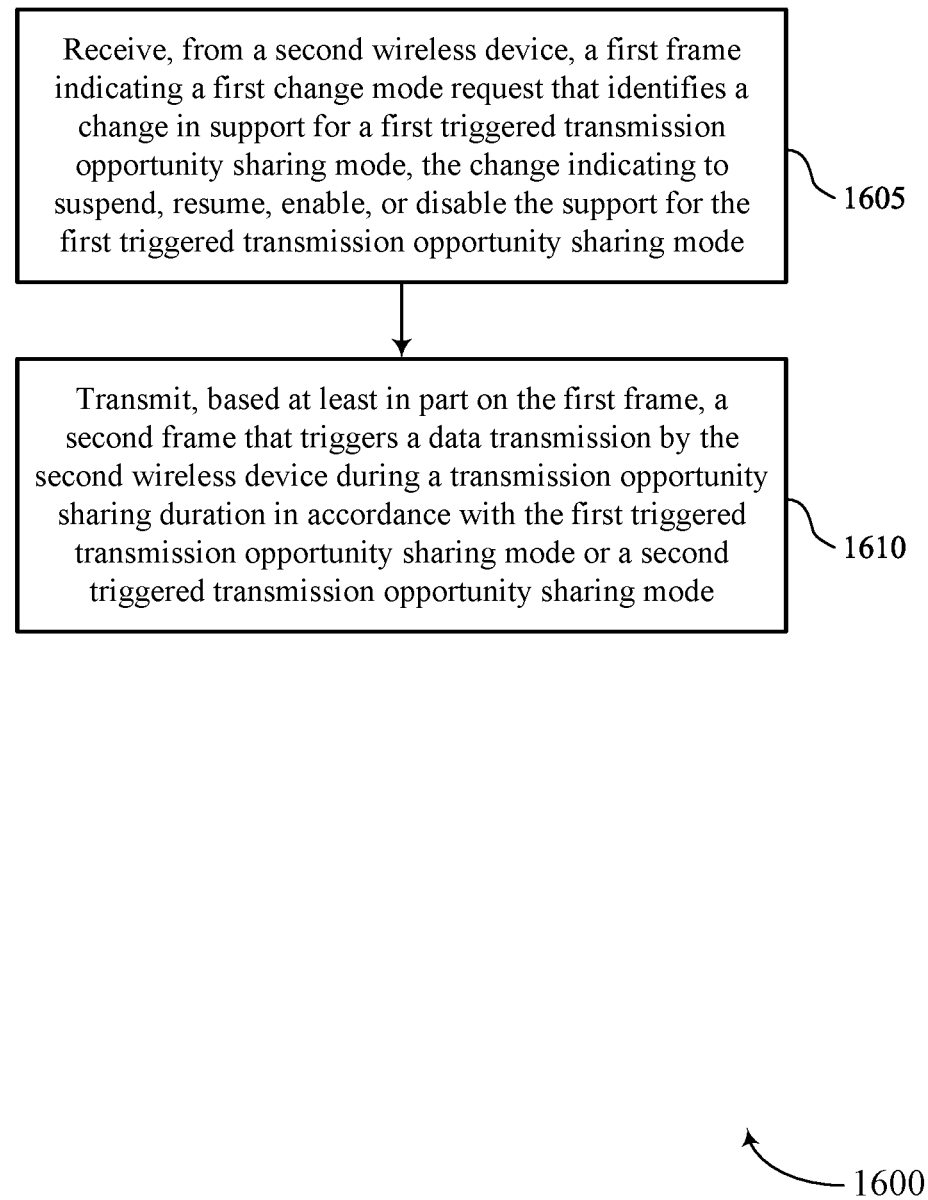
FIGS. 16 through 21 show flowcharts illustrating methods that support dynamic selection of triggered TXOP sharing modes in accordance with one or more aspects of the present disclosure.

FIG. 16 shows a flowchart illustrating a method 1600 that supports dynamic selection of triggered TXOP sharing modes in accordance with one or more aspects of the present disclosure. The operations of the method 1600 may be implemented by a first wireless device or its components as described herein. For example, the operations of the method 1600 may be performed by a first wireless device as described with reference to FIGS. 1 through 11. In some examples, a first wireless device may execute a set of instructions to control the functional elements of the first wireless device to perform the described functions. Additionally, or alternatively, the first wireless device may perform aspects of the described functions using special-purpose hardware.

At 1605, the method may include receiving, from a second wireless device, a first frame indicating a first change mode request that identifies a change in support for a first triggered TXOP sharing mode, the change indicating to suspend, resume, enable, or disable the support for the first triggered TXOP sharing mode. For example, the operations of 1605 may be performed by one or more APs, STAs, or both (e.g. which may be MLD APs or STAs). The operations of 1605 may be performed in accordance with examples as disclosed herein. In some examples, aspects of the operations of 1605 may be performed by a change component 1025 as described with reference to FIG. 10.

At 1610, the method may include transmitting, based on the first frame, a second frame that triggers a data transmission by the second wireless device during a TXOP sharing duration in accordance with the first triggered TXOP sharing mode or a second triggered TXOP sharing mode. For example, the operations of 1610 may be performed by one or more APs, STAs, or both (e.g. which may be MLD APs or STAs). The operations of 1610 may be performed in accordance with examples as disclosed herein. In some examples, aspects of the operations of 1610 may be performed by a trigger component 1030 as described with reference to FIG. 10.

Figure 17:
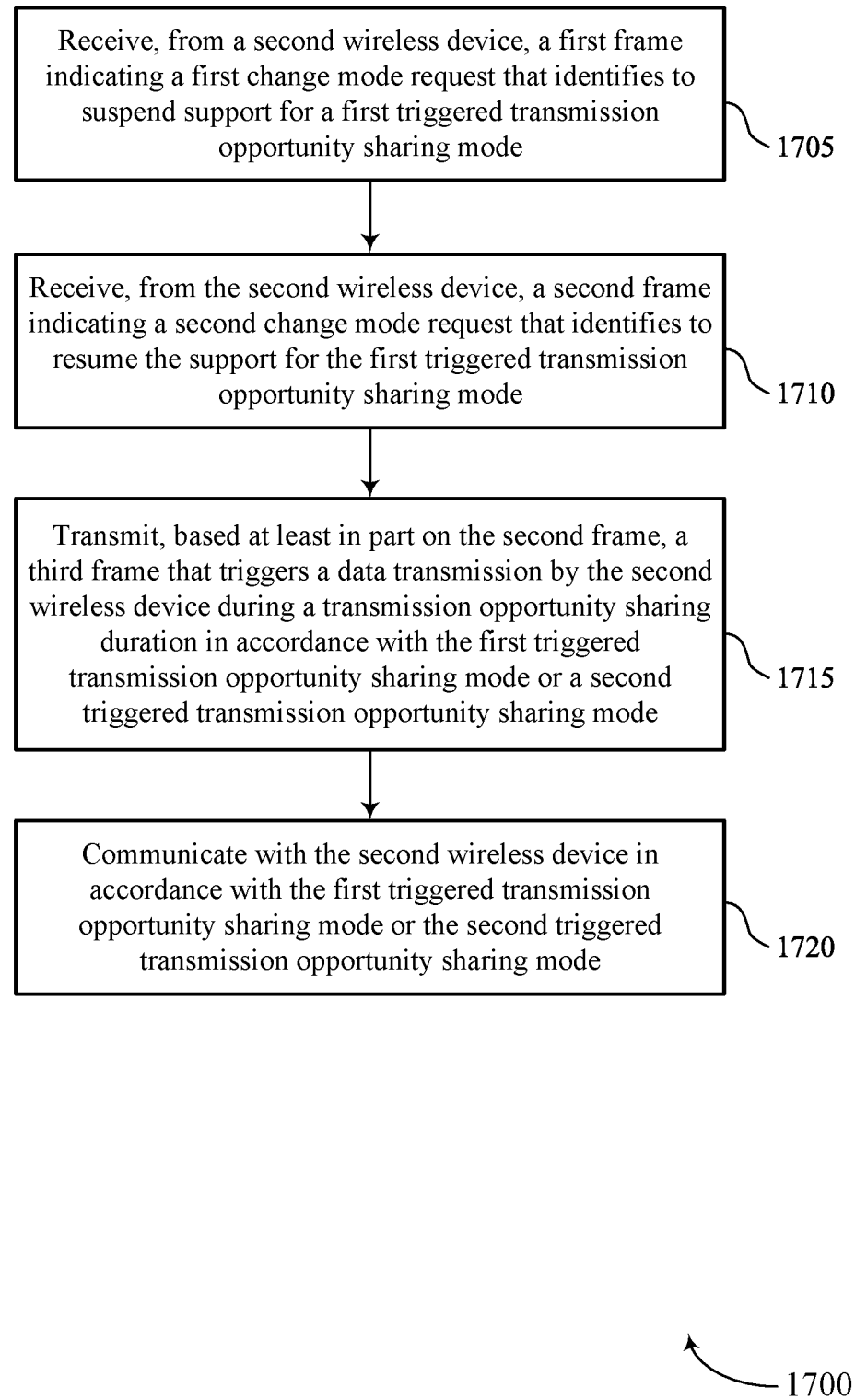

FIG. 17 shows a flowchart illustrating a method 1700 that supports dynamic selection of triggered TXOP sharing modes in accordance with one or more aspects of the present disclosure. The operations of the method 1700 may be implemented by a first wireless device or its components as described herein. For example, the operations of the method 1700 may be performed by a first wireless device as described with reference to FIGS. 1 through 11. In some examples, a first wireless device may execute a set of instructions to control the functional elements of the first wireless device to perform the described functions. Additionally, or alternatively, the first wireless device may perform aspects of the described functions using special-purpose hardware.

At 1705, the method may include receiving, from a second wireless device, a first frame indicating a first change mode request that identifies to suspend support for a first triggered TXOP sharing mode. For example, the operations of 1705 may be performed by one or more APs, STAs, or both (e.g. which may be MLD APs or STAs). The operations of 1705 may be performed in accordance with examples as disclosed herein. In some examples, aspects of the operations of 1705 may be performed by a suspension component 1055 as described with reference to FIG. 10.

At 1710, the method may include receiving, from the second wireless device, a second frame indicating a second change mode request that identifies to resume the support for the first triggered TXOP sharing mode. For example, the operations of 1710 may be performed by one or more APs, STAs, or both (e.g. which may be MLD APs or STAs). The operations of 1710 may be performed in accordance with examples as disclosed herein. In some examples, aspects of the operations of 1710 may be performed by a resumption component 1060 as described with reference to FIG. 10.

At 1715, the method may include transmitting, based on the second frame, a third frame that triggers a data transmission by the second wireless device during a TXOP sharing duration in accordance with the first triggered TXOP sharing mode or a second triggered TXOP sharing mode. For example, the operations of 1715 may be performed by one or more APs, STAs, or both (e.g. which may be MLD APs or STAs). The operations of 1715 may be performed in accordance with examples as disclosed herein. In some examples, aspects of the operations of 1715 may be performed by a trigger component 1030 as described with reference to FIG. 10.

At 1720, the method may include communicating with the second wireless device in accordance with the first triggered TXOP sharing mode or the second triggered TXOP sharing mode. For example, the operations of 1720 may be performed by one or more APs, STAs, or both (e.g. which may be MLD APs or STAs). The operations of 1720 may be performed in accordance with examples as disclosed herein. In some examples, aspects of the operations of 1720 may be performed by a communication component 1050 as described with reference to FIG. 10.

Figure 18:
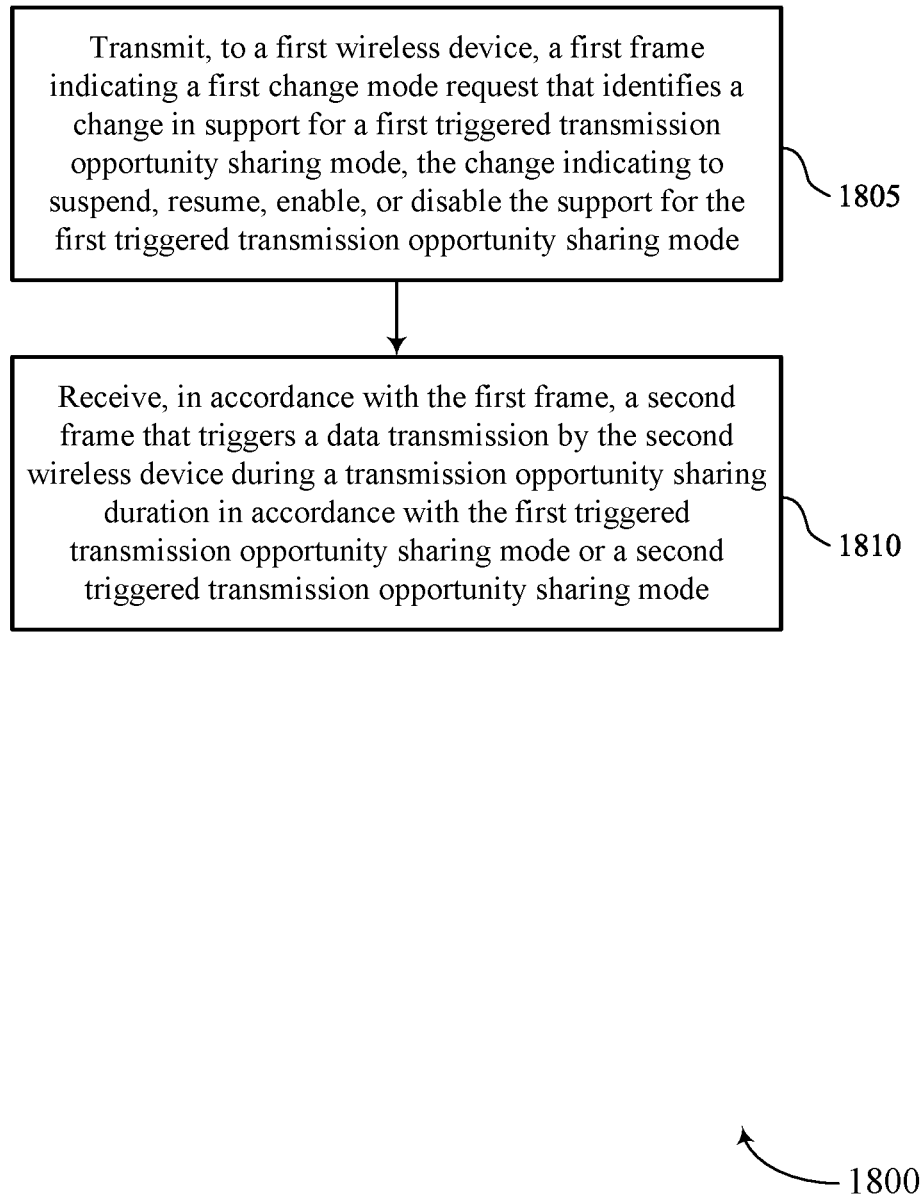

FIG. 18 shows a flowchart illustrating a method 1800 that supports dynamic selection of triggered TXOP sharing modes in accordance with one or more aspects of the present disclosure. The operations of the method 1800 may be implemented by a second wireless device or its components as described herein. For example, the operations of the method 1800 may be performed by a second wireless device as described with reference to FIGS. 1 through 7 and 12 through 15. In some examples, a second wireless device may execute a set of instructions to control the functional elements of the second wireless device to perform the described functions. Additionally, or alternatively, the second wireless device may perform aspects of the described functions using special-purpose hardware.

At 1805, the method may include transmitting, to a first wireless device, a first frame indicating a first change mode request that identifies a change in support for a first triggered TXOP sharing mode, the change indicating to suspend, resume, enable, or disable the support for the first triggered TXOP sharing mode. For example, the operations of 1805 may be performed by one or more APs, STAs, or both (e.g. which may be MLD APs or STAs). The operations of 1805 may be performed in accordance with examples as disclosed herein. In some examples, aspects of the operations of 1805 may be performed by a frame component 1425 as described with reference to FIG. 14.

At 1810, the method may include receiving, in accordance with the first frame, a second frame that triggers a data transmission by the second wireless device during a TXOP sharing duration in accordance with the first triggered TXOP sharing mode or a second triggered TXOP sharing mode. For example, the operations of 1810 may be performed by one or more APs, STAs, or both (e.g. which may be MLD APs or STAs). The operations of 1810 may be performed in accordance with examples as disclosed herein. In some examples, aspects of the operations of 1810 may be performed by a TXOP sharing mode component 1430 as described with reference to FIG. 14.

Figure 19:
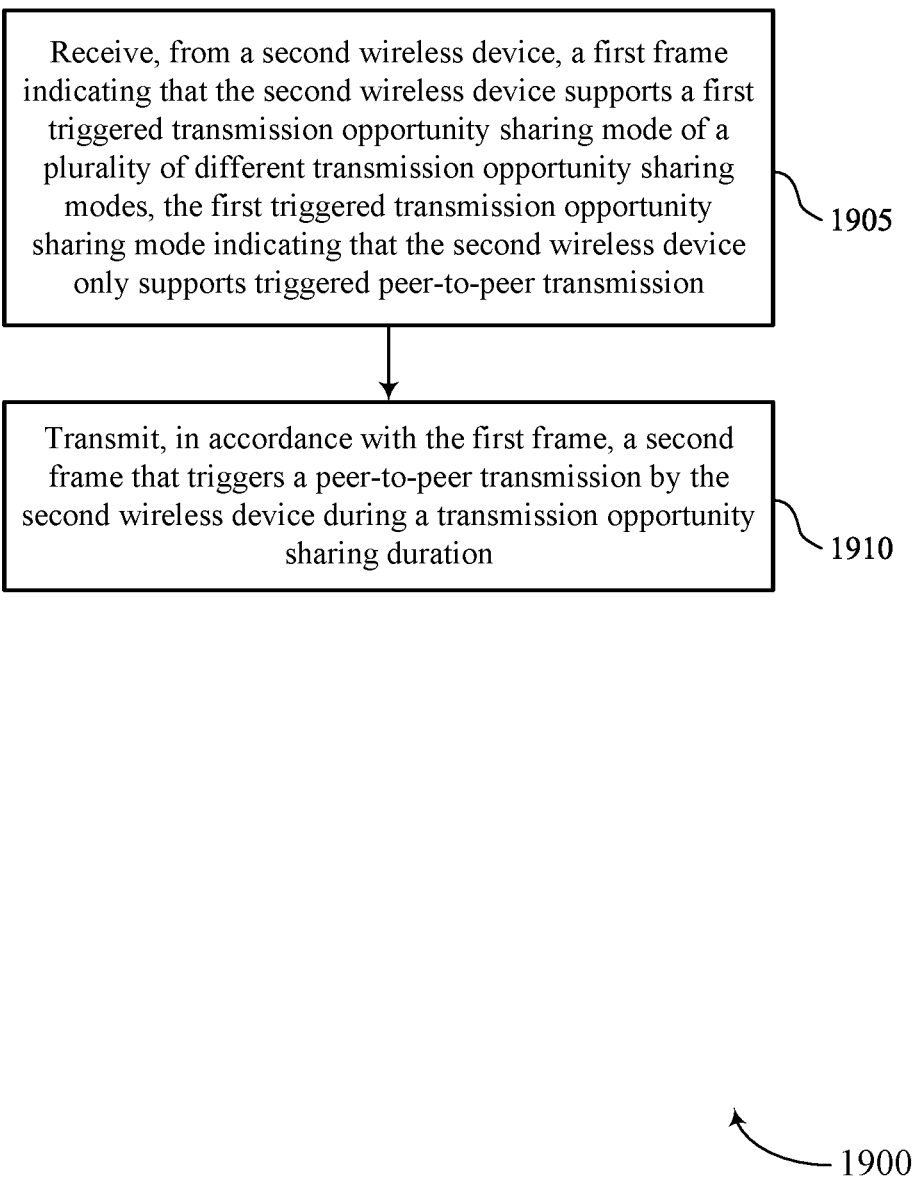

FIG. 19 shows a flowchart illustrating a method 1900 that supports dynamic selection of triggered TXOP sharing modes in accordance with one or more aspects of the present disclosure. The operations of the method 1900 may be implemented by a first wireless device or its components as described herein. For example, the operations of the method 1900 may be performed by a first wireless device as described with reference to FIGS. 1 through 11. In some examples, a first wireless device may execute a set of instructions to control the functional elements of the first wireless device to perform the described functions. Additionally, or alternatively, the first wireless device may perform aspects of the described functions using special-purpose hardware.

At 1905, the method may include receiving, from a second wireless device, a first frame indicating that the second wireless device supports a first triggered TXOP sharing mode of a set of multiple different TXOP sharing modes, the first triggered TXOP sharing mode indicating that the second wireless device only supports triggered P2P transmission. For example, the operations of 1905 may be performed by one or more APs, STAs, or both (e.g. which may be MLD APs or STAs). The operations of 1905 may be performed in accordance with examples as disclosed herein. In some examples, aspects of the operations of 1905 may be performed by a capability component 1035 as described with reference to FIG. 10.

At 1910, the method may include transmitting, in accordance with the first frame, a second frame that triggers a P2P transmission by the second wireless device during a TXOP sharing duration. For example, the operations of 1910 may be performed by one or more APs, STAs, or both (e.g. which may be MLD APs or STAs). The operations of 1910 may be performed in accordance with examples as disclosed herein. In some examples, aspects of the operations of 1910 may be performed by a transmission component 1040 as described with reference to FIG. 10.

Figure 20:
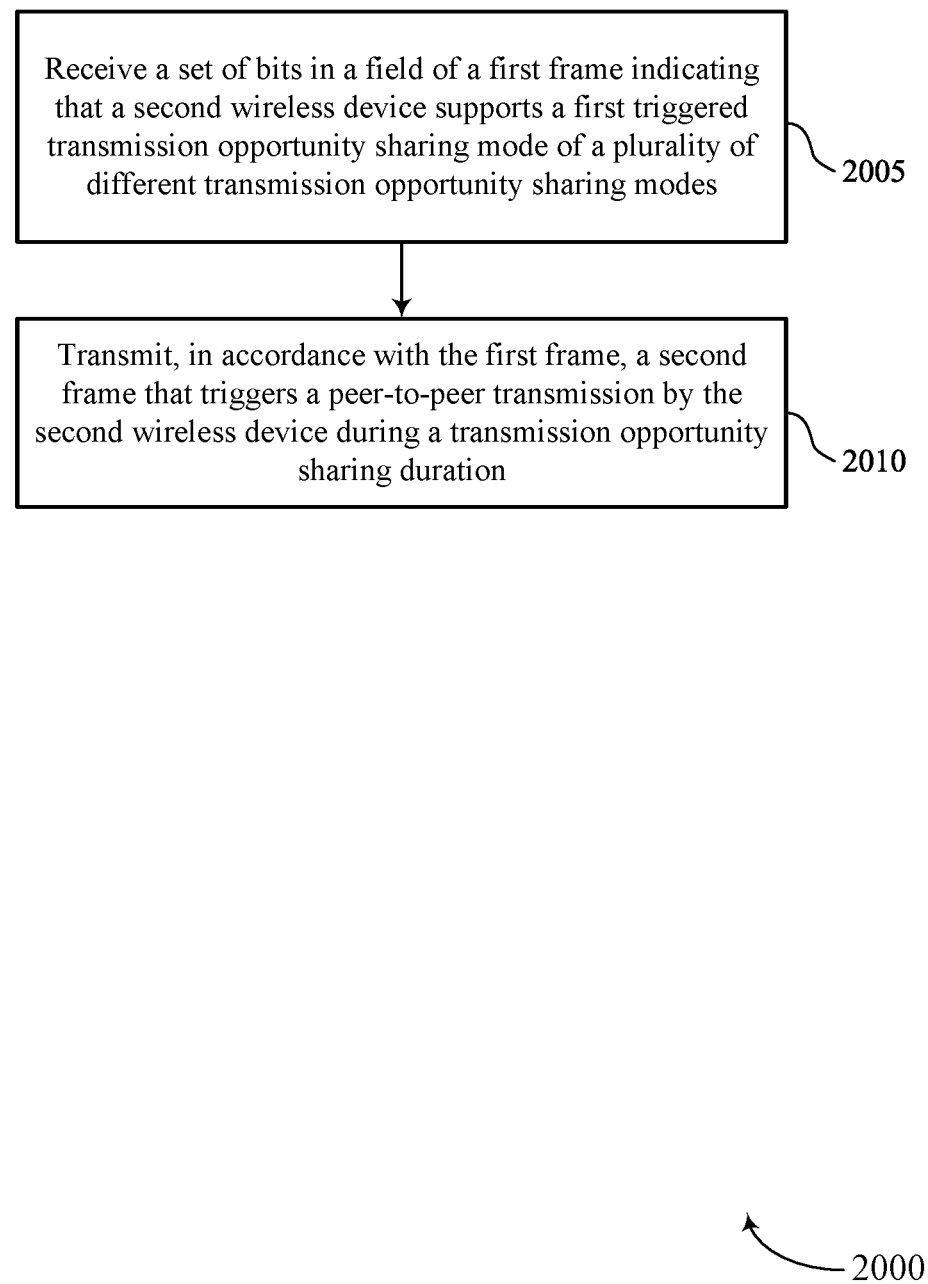

FIG. 20 shows a flowchart illustrating a method 2000 that supports dynamic selection of triggered TXOP sharing modes in accordance with one or more aspects of the present disclosure. The operations of the method 2000 may be implemented by a first wireless device or its components as described herein. For example, the operations of the method 2000 may be performed by a first wireless device as described with reference to FIGS. 1 through 11. In some examples, a first wireless device may execute a set of instructions to control the functional elements of the first wireless device to perform the described functions. Additionally, or alternatively, the first wireless device may perform aspects of the described functions using special-purpose hardware.

At 2005, the method may include receiving a set of bits in a field of a first frame indicating that a second wireless device supports a first triggered TXOP sharing mode of a set of multiple different TXOP sharing modes. For example, the operations of 2005 may be performed by one or more APs, STAs, or both (e.g. which may be MLD APs or STAs). The operations of 2005 may be performed in accordance with examples as disclosed herein. In some examples, aspects of the operations of 2005 may be performed by a field component 1065 as described with reference to FIG. 10.

At 2010, the method may include transmitting, in accordance with the first frame, a second frame that triggers a P2P transmission by the second wireless device during a TXOP sharing duration. For example, the operations of 2010 may be performed by one or more APs, STAs, or both (e.g. which may be MLD APs or STAs). The operations of 2010 may be performed in accordance with examples as disclosed herein. In some examples, aspects of the operations of 2010 may be performed by a transmission component 1040 as described with reference to FIG. 10.

Figure 21:
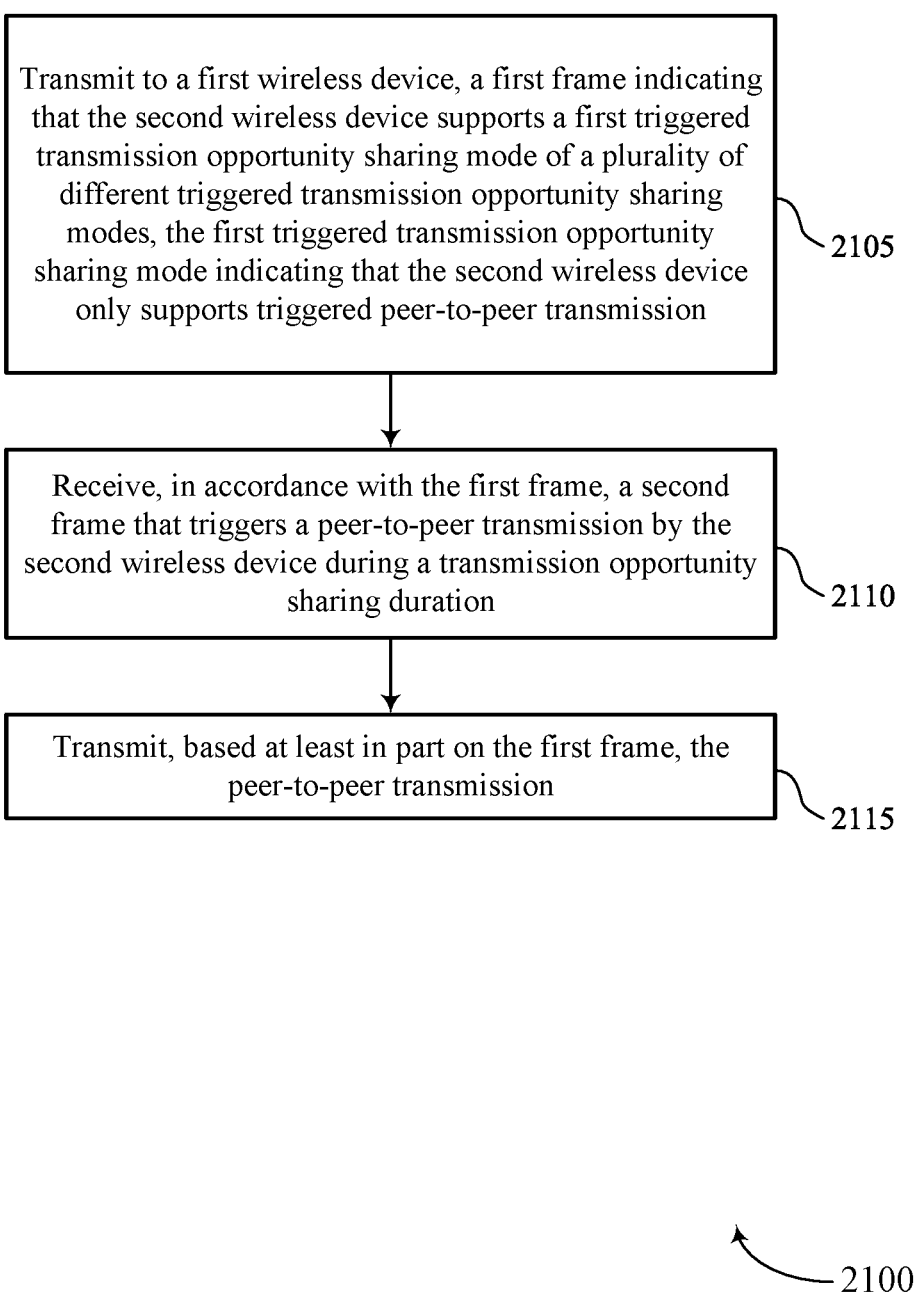

FIG. 21 shows a flowchart illustrating a method 2100 that supports dynamic selection of triggered TXOP sharing modes in accordance with one or more aspects of the present disclosure. The operations of the method 2100 may be implemented by a second wireless device or its components as described herein. For example, the operations of the method 2100 may be performed by a second wireless device as described with reference to FIGS. 1 through 7 and 12 through 15. In some examples, a second wireless device may execute a set of instructions to control the functional elements of the second wireless device to perform the described functions. Additionally, or alternatively, the second wireless device may perform aspects of the described functions using special-purpose hardware.

At 2105, the method may include transmitting to a first wireless device, a first frame indicating that the second wireless device supports a first triggered TXOP sharing mode of a set of multiple different triggered TXOP sharing modes, the first triggered TXOP sharing mode indicating that the second wireless device only supports triggered P2P transmission. For example, the operations of 2105 may be performed by one or more APs, STAs, or both (e.g. which may be MLD APs or STAs). The operations of 2105 may be performed in accordance with examples as disclosed herein. In some examples, aspects of the operations of 2105 may be performed by a capability frame component 1435 as described with reference to FIG. 14.

At 2110, the method may include receiving, in accordance with the first frame, a second frame that triggers a P2P transmission by the second wireless device during a TXOP sharing duration. For example, the operations of 2110 may be performed by one or more APs, STAs, or both (e.g. which may be MLD APs or STAs). The operations of 2110 may be performed in accordance with examples as disclosed herein. In some examples, aspects of the operations of 2110 may be performed by a trigger frame component 1440 as described with reference to FIG. 14.

At 2115, the method may include transmitting, based on the first frame, the P2P transmission. For example, the operations of 2115 may be performed by one or more APs, STAs, or both (e.g. which may be MLD APs or STAs). The operations of 2115 may be performed in accordance with examples as disclosed herein. In some examples, aspects of the operations of 2115 may be performed by a P2P transmission component 1445 as described with reference to FIG. 14.

The following provides an overview of aspects of the present disclosure:

Aspect 1: A method for wireless communications at a first wireless device, comprising: receiving, from a second wireless device, a first frame indicating a first change mode request that identifies a change in support for a first triggered transmission opportunity sharing mode, the change indicating to suspend, resume, enable, or disable the support for the first triggered transmission opportunity sharing mode; and transmitting, based at least in part on the first frame, a second frame that triggers a data transmission by the second wireless device during a transmission opportunity sharing duration in accordance with the first triggered transmission opportunity sharing mode or a second triggered transmission opportunity sharing mode.

Aspect 2: The method of aspect 1, wherein the first frame comprises a link identifier of a link to which the change in the support for the first triggered transmission opportunity sharing mode applies.

Aspect 3: The method of any of aspects 1 through 2, wherein the first frame indicates a time or a time offset associated with disablement, enablement, suspension, or resumption of the support for the first triggered transmission opportunity sharing mode.

Aspect 4: The method of any of aspects 1 through 3, further comprising: communicating with the second wireless device in accordance with the first triggered transmission opportunity sharing mode or the second triggered transmission opportunity sharing mode.

Aspect 5: The method of any of aspects 1 through 4, wherein the first frame indicates to suspend, resume, enable, or disable the support for the second triggered transmission opportunity sharing mode or a third triggered transmission opportunity sharing mode.

Aspect 6: The method of any of aspects 1 through 5, wherein the first frame indicates to suspend the support for the first triggered transmission opportunity sharing mode; and receiving, from the second wireless device, a third frame indicating a second change mode request that identifies to resume the support for the first triggered transmission opportunity sharing mode.

Aspect 7: The method of any of aspects 1 through 6, wherein the first frame indicates the change in support for the first triggered transmission opportunity sharing mode for a defined time interval; and transmitting the second frame that triggers the data transmission by the second wireless device during the transmission opportunity sharing duration that occurs subsequent to the defined time interval in accordance with the first triggered transmission opportunity sharing mode or the second triggered transmission opportunity sharing mode.

Aspect 8: The method of any of aspects 1 through 7, wherein the first frame is a medium access control frame comprising a medium access control frame header that includes a control field indicating the change in the support for the first triggered transmission opportunity sharing mode.

Aspect 9: The method of any of aspects 1 through 8, wherein the first frame is a management frame indicating the change in the support for the first triggered transmission opportunity sharing mode.

Aspect 10: The method of any of aspects 1 through 9, wherein the first frame is a control frame indicating the change in the support for the first triggered transmission opportunity sharing mode.

Aspect 11: The method of any of aspects 1 through 10, further comprising: communicating with the second wireless device during operation of the first triggered transmission opportunity sharing mode prior to receiving the first frame.

Aspect 12: The method of any of aspects 1 through 11, wherein the first triggered transmission opportunity sharing mode indicates that triggered uplink single-user transmissions and that triggered peer-to-peer transmissions are both unsupported by the first wireless device, indicates that the triggered uplink single-user transmissions are supported by the first wireless device, indicates that the triggered peer-to-peer transmissions are supported by the first wireless device, or indicates that the triggered uplink single-user transmissions and the triggered peer-to-peer transmissions are both supported by the first wireless device.

Aspect 13: The method of any of aspects 1 through 12, wherein the first wireless device is an access point or a station, and wherein the second wireless device is an access point or a station.

Aspect 14: The method of any of aspects 1 through 13, wherein the first wireless device is affiliated with a multi-link device (MLD).

Aspect 15: A method for wireless communications at a second wireless device, comprising: transmitting, to a first wireless device, a first frame indicating a first change mode request that identifies a change in support for a first triggered transmission opportunity sharing mode, the change indicating to suspend, resume, enable, or disable the support for the first triggered transmission opportunity sharing mode; and receiving, in accordance with the first frame, a second frame that triggers a data transmission by the second wireless device during a transmission opportunity sharing duration in accordance with the first triggered transmission opportunity sharing mode or a second triggered transmission opportunity sharing mode.

Aspect 16: The method of aspect 15, wherein the first frame comprises a link identifier of a link to which the change in the support for the first triggered transmission opportunity sharing mode applies.

Aspect 17: The method of any of aspects 15 through 16, wherein the first frame indicates a time or a time offset associated with disablement, enablement, suspension, or resumption of the support for the first triggered transmission opportunity sharing mode.

Aspect 18: The method of any of aspects 15 through 17, further comprising: communicating with the first wireless device in accordance with the first triggered transmission opportunity sharing mode or the second triggered transmission opportunity sharing mode.

Aspect 19: The method of any of aspects 15 through 18, wherein transmitting the first frame comprises: transmitting the first frame indicating the first change mode request that identifies to suspend, resume, enable, or disable the support for the second triggered transmission opportunity sharing mode or a third triggered transmission opportunity sharing mode.

Aspect 20: The method of any of aspects 15 through 19, wherein the first frame indicates to suspend the support for the first triggered transmission opportunity sharing mode; and transmitting, to the first wireless device, a third frame indicating a second change mode request that identifies to resume the support for the first triggered transmission opportunity sharing mode.

Aspect 21: The method of any of aspects 15 through 20, wherein the first frame indicates the change in the support for the first triggered transmission opportunity sharing mode for a defined time interval; and receiving the second frame that triggers the data transmission by the second wireless device during the transmission opportunity sharing duration that occurs subsequent to the defined time interval in accordance with the first triggered transmission opportunity sharing mode or the second triggered transmission opportunity sharing mode.

Aspect 22: The method of any of aspects 15 through 21, further comprising: transmitting one or more physical layer protocol data units using one or more receive chains, one or more transmit chains, and an operating channel width associated with the first triggered transmission opportunity sharing mode; and suspending transmission of the one or more physical layer protocol data units based at least in part on receiving the second frame.

Aspect 23: The method of any of aspects 15 through 22, wherein the first frame is a medium access control frame comprising a medium access control frame header that includes a control field indicating the change in the support for the first triggered transmission opportunity sharing mode.
- Aspect 24: The method of any of aspects 15 through 23, wherein the first frame is a management frame indicating the change in the support for the first triggered transmission opportunity sharing mode.
- Aspect 25: The method of any of aspects 15 through 24, wherein the first frame is a control frame indicating the change in the support for the first triggered transmission opportunity sharing mode.
- Aspect 26: The method of any of aspects 15 through 25, further comprising: communicating with the first wireless device during operation of the first triggered transmission opportunity sharing mode prior to transmitting the first frame.
- Aspect 27: The method of any of aspects 15 through 26, wherein the first triggered transmission opportunity sharing mode indicates that triggered uplink single-user transmissions and that triggered peer-to-peer transmissions are both unsupported by the first wireless device, indicates that the triggered uplink single-user transmissions are supported by the first wireless device, indicates that the triggered peer-to-peer transmissions are supported by the first wireless device, or indicates that the triggered uplink single-user transmissions and the triggered peer-to-peer transmissions are both supported by the first wireless device.
- Aspect 28: The method of any of aspects 15 through 27, wherein the first wireless device is an access point or a station and the second wireless device is an access point or a station, or the second wireless device is affiliated with a multi-link device (MLD).
- Aspect 29: A method for wireless communications at a first wireless device, comprising: receiving, from a second wireless device, a first frame indicating that the second wireless device supports a first triggered transmission opportunity sharing mode of a plurality of different transmission opportunity sharing modes, the first triggered transmission opportunity sharing mode indicating that the second wireless device only supports triggered peer-to-peer transmission; and transmitting, in accordance with the first frame, a second frame that triggers a peer-to-peer transmission by the second wireless device during a transmission opportunity sharing duration.
- Aspect 30: The method of aspect 29, wherein receiving the first frame comprises: receiving a set of bits in a field of the first frame indicating that the second wireless device supports the first triggered transmission opportunity sharing mode of the plurality of different transmission opportunity sharing modes.
- Aspect 31: The method of any of aspects 29 through 30, wherein receiving the first frame comprises: receiving the first frame as part of an association procedure performed with the second wireless device.
- Aspect 32: The method of any of aspects 29 through 31, wherein the first triggered transmission opportunity sharing mode indicates that triggered uplink single-user transmissions and that triggered peer-to-peer transmissions are both unsupported by the first wireless device, indicates that the triggered uplink single-user transmissions are supported by the first wireless device, indicates that the triggered peer-to-peer transmissions are supported by the first wireless device, or indicates that the triggered uplink single-user transmissions and the triggered peer-to-peer transmissions are both supported by the first wireless device.
- Aspect 33: The method of any of aspects 29 through 32, wherein the first wireless device is an access point or a station, and wherein the second wireless device is an access point or a station.
- Aspect 34: The method of any of aspects 29 through 33, wherein the first wireless device is a first access point and the second wireless device is a second access point.
- Aspect 35: The method of any of aspects 29 through 34, wherein the second frame indicates an access category, a traffic identifier, or both.
- Aspect 36: A method for wireless communications at a second wireless device, comprising: transmitting to a first wireless device, a first frame indicating that the second wireless device supports a first triggered transmission opportunity sharing mode of a plurality of different triggered transmission opportunity sharing modes, the first triggered transmission opportunity sharing mode indicating that the second wireless device only supports triggered peer-to-peer transmission; receiving, in accordance with the first frame, a second frame that triggers a peer-to-peer transmission by the second wireless device during a transmission opportunity sharing duration; and transmitting, based at least in part on the first frame, the peer-to-peer transmission.
- Aspect 37: The method of aspect 36, wherein transmitting the first frame comprises: transmitting a set of bits in a field of the first frame indicating that the second wireless device supports the first triggered transmission opportunity sharing mode of the plurality of different triggered transmission opportunity sharing modes.
- Aspect 38: The method of any of aspects 36 through 37, wherein transmitting the first frame comprises: transmitting the first frame as part of an association procedure performed with the first wireless device.
- Aspect 39: The method of any of aspects 36 through 38, wherein the first triggered transmission opportunity sharing mode indicates that triggered uplink single-user transmissions and that triggered peer-to-peer transmissions are both unsupported by the first wireless device, indicates that the triggered uplink single-user transmissions are supported by the first wireless device, indicates that the triggered peer-to-peer transmissions are supported by the first wireless device, or indicates that the triggered uplink single-user transmissions and the triggered peer-to-peer transmissions are both supported by the first wireless device.
- Aspect 40: The method of any of aspects 36 through 39, wherein the first wireless device is an access point or a station, and wherein the second wireless device is an access point or a station.
- Aspect 41: The method of any of aspects 36 through 40, wherein the first wireless device is a first access point and the second wireless device is a second access point.
- Aspect 42: The method of any of aspects 36 through 41, wherein the second frame indicates an access category, a traffic identifier, or both.
- Aspect 43: An apparatus for wireless communications at a first wireless device, comprising a processor; memory coupled with the processor; and instructions stored in the memory and executable by the processor to cause the apparatus to perform a method of any of aspects 1 through 14.
- Aspect 44: An apparatus for wireless communications at a first wireless device, comprising at least one means for performing a method of any of aspects 1 through 14.

Aspect 45: A non-transitory computer-readable medium storing code for wireless communications at a first wireless device, the code comprising instructions executable by a processor to perform a method of any of aspects 1 through 14.

Aspect 46: An apparatus for wireless communications at a second wireless device, comprising a processor; memory coupled with the processor; and instructions stored in the memory and executable by the processor to cause the apparatus to perform a method of any of aspects 15 through 28.

Aspect 47: An apparatus for wireless communications at a second wireless device, comprising at least one means for performing a method of any of aspects 15 through 28.

Aspect 48: A non-transitory computer-readable medium storing code for wireless communications at a second wireless device, the code comprising instructions executable by a processor to perform a method of any of aspects 15 through 28.

Aspect 49: An apparatus for wireless communications at a first wireless device, comprising a processor; memory coupled with the processor; and instructions stored in the memory and executable by the processor to cause the apparatus to perform a method of any of aspects 29 through 35.

Aspect 50: An apparatus for wireless communications at a first wireless device, comprising at least one means for performing a method of any of aspects 29 through 35.

Aspect 51: A non-transitory computer-readable medium storing code for wireless communications at a first wireless device, the code comprising instructions executable by a processor to perform a method of any of aspects 29 through 35.

Aspect 52: An apparatus for wireless communications at a second wireless device, comprising a processor; memory coupled with the processor; and instructions stored in the memory and executable by the processor to cause the apparatus to perform a method of any of aspects 36 through 42.

Aspect 53: An apparatus for wireless communications at a second wireless device, comprising at least one means for performing a method of any of aspects 36 through 42.

Aspect 54: A non-transitory computer-readable medium storing code for wireless communications at a second wireless device, the code comprising instructions executable by a processor to perform a method of any of aspects 36 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first wireless device, comprising:
   one or more processors;
   memory coupled with the one or more processors; and
   instructions stored in the memory and executable by the one or more processors to cause the apparatus to:
   receive, from a second wireless device, a first frame comprising an extremely high throughput (EHT) medium access control (MAC) capabilities information field that indicates whether the second wireless device supports a first triggered transmission opportunity sharing mode; and
   transmit, based at least in part on the first frame, a second frame that triggers a transmission by the second wireless device during a transmission opportunity sharing duration in accordance with the first triggered transmission opportunity sharing mode or a second triggered transmission opportunity sharing mode.

2. The apparatus of claim 1, further comprising:
   receive a third frame indicating a first change mode request that identifies a change in support for the first triggered transmission opportunity sharing mode, the change indicating to suspend, resume, enable, or disable the support for the first triggered transmission opportunity sharing mode,
   wherein the third frame comprises a link identifier of a link to which the change in the support for the first triggered transmission opportunity sharing mode applies.

3. The apparatus of claim 2, wherein the third frame indicates a time or a time offset associated with disablement, enablement, suspension, or resumption of the support for the first triggered transmission opportunity sharing mode.

4. The apparatus of claim 2, wherein the third frame indicates to suspend, resume, enable, or disable support for the second triggered transmission opportunity sharing mode or a third triggered transmission opportunity sharing mode.

5. The apparatus of claim 2, wherein the third frame indicates to suspend the support for the first triggered transmission opportunity sharing mode; and
   wherein the instructions are further executable by the one or more processors to cause the apparatus to:
   receive, from the second wireless device, a fourth frame indicating a second change mode request that identifies to resume the support for the first triggered transmission opportunity sharing mode.

6. The apparatus of claim 2, wherein the third frame indicates the change in the support for the first triggered transmission opportunity sharing mode for a defined time interval; and
   wherein the instructions are further executable by the one or more processors to cause the apparatus to:
   transmit a fourth frame that triggers a second transmission by the second wireless device during a second transmission opportunity sharing duration that occurs subsequent to the defined time interval in accordance with the first triggered transmission opportunity sharing mode or the second triggered transmission opportunity sharing mode.

7. The apparatus of claim 2, wherein the third frame is a medium access control frame comprising a medium access control frame header that includes a control field indicating the change in the support for the first triggered transmission opportunity sharing mode.

8. The apparatus of claim 2, wherein the third frame is a management frame indicating the change in the support for the first triggered transmission opportunity sharing mode.

9. The apparatus of claim 2, wherein the third frame is a control frame indicating the change in the support for the first triggered transmission opportunity sharing mode.

10. The apparatus of claim 1, wherein the instructions are further executable by the one or more processors to cause the apparatus to:

communicate with the second wireless device in accordance with the first triggered transmission opportunity sharing mode or the second triggered transmission opportunity sharing mode.

11. The apparatus of claim 1, wherein the instructions are further executable by the one or more processors to cause the apparatus to:
communicate with the second wireless device during operation of the first triggered transmission opportunity sharing mode prior to receiving the first frame.

12. The apparatus of claim 1, wherein the first triggered transmission opportunity sharing mode indicates that triggered uplink single-user transmissions and that triggered peer-to-peer transmissions are both unsupported by the first wireless device, indicates that the triggered uplink single-user transmissions are supported by the first wireless device, indicates that the triggered peer-to-peer transmissions are supported by the first wireless device, or indicates that the triggered uplink single-user transmissions and the triggered peer-to-peer transmissions are both supported by the first wireless device.

13. The apparatus of claim 1, wherein the first wireless device is an access point or a station, and
wherein the second wireless device is an access point or a station.

14. The apparatus of claim 1, wherein the first wireless device is affiliated with a multi-link device (MLD).

15. An apparatus for wireless communications at a second wireless device, comprising:
one or more processors;
memory coupled with the one or more processors; and
instructions stored in the memory and executable by the one or more processors to cause the apparatus to:
transmit, to a first wireless device, a first frame comprising an extremely high throughput (EHT) medium access control (MAC) capabilities information field that indicates whether the second wireless device supports a first triggered transmission opportunity sharing mode; and
receive, in accordance with the first frame, a second frame that triggers a transmission by the second wireless device during a transmission opportunity sharing duration in accordance with the first triggered transmission opportunity sharing mode or a second triggered transmission opportunity sharing mode.

16. The apparatus of claim 15, further comprising:
transmit a third frame indicating a first change mode request that identifies a change in support for the first triggered transmission opportunity sharing mode, the change indicating to suspend, resume, enable, or disable the support for the first triggered transmission opportunity sharing mode,
wherein the third frame comprises a link identifier of a link to which the change in the support for the first triggered transmission opportunity sharing mode applies.

17. The apparatus of claim 16, wherein the third frame indicates a time or a time offset associated with disablement, enablement, suspension, or resumption of the support for the first triggered transmission opportunity sharing mode.

18. The apparatus of claim 16, wherein the third frame indicates to suspend, resume, enable, or disable the support for the second triggered transmission opportunity sharing mode or a third triggered transmission opportunity sharing mode.

19. The apparatus of claim 16, wherein the third frame indicates to suspend the support for the first triggered transmission opportunity sharing mode; and
wherein the instructions are further executable by the one or more processors to cause the apparatus to:
transmit, to the first wireless device, a fourth frame indicating a second change mode request that identifies to resume the support for the first triggered transmission opportunity sharing mode.

20. The apparatus of claim 16, wherein the third frame indicates the change in the support for the first triggered transmission opportunity sharing mode for a defined time interval; and
wherein the instructions are further executable by the one or more processors to cause the apparatus to:
receive a fourth frame that triggers a second transmission by the second wireless device during a second transmission opportunity sharing duration that occurs subsequent to the defined time interval in accordance with the first triggered transmission opportunity sharing mode or the second triggered transmission opportunity sharing mode.

21. The apparatus of claim 15, wherein the instructions are further executable by the one or more processors to cause the apparatus to:
communicate with the first wireless device in accordance with the first triggered transmission opportunity sharing mode or the second triggered transmission opportunity sharing mode.

22. The apparatus of claim 15, wherein the instructions are further executable by the one or more processors to cause the apparatus to:
transmit one or more PPDUs using one or more receive chains, one or more transmit chains, and an operating channel width associated with the first triggered transmission opportunity sharing mode; and
suspend transmission of the one or more PPDUs based at least in part on receiving the second frame.

23. An apparatus for wireless communications at a first wireless device, comprising:
one or more processors;
memory coupled with the one or more processors; and
instructions stored in the memory and executable by the one or more processors to cause the apparatus to:
receive, from a second wireless device, a first frame comprising one or more fields indicating that the second wireless device supports a first triggered transmission opportunity sharing mode of a plurality of different transmission opportunity sharing modes, the first triggered transmission opportunity sharing mode indicating that the second wireless device supports triggered peer-to-peer transmissions; and
transmit, in accordance with the first frame, a second frame that triggers a peer-to-peer transmission by the second wireless device during a transmission opportunity sharing duration.

24. The apparatus of claim 23, wherein the instructions to receive the first frame are executable by the one or more processors to cause the apparatus to:
receive a set of bits in a field of the first frame indicating that the second wireless device supports the first triggered transmission opportunity sharing mode of the plurality of different transmission opportunity sharing modes.

25. The apparatus of claim 23, wherein the instructions to receive the first frame are executable by the one or more processors to cause the apparatus to:

receive the first frame as part of an association procedure performed with the second wireless device.

26. The apparatus of claim 23, wherein the first triggered transmission opportunity sharing mode indicates that triggered uplink single-user transmissions and that the triggered peer-to-peer transmissions are both unsupported by the first wireless device, indicates that the triggered uplink single-user transmissions are supported by the first wireless device, indicates that the triggered peer-to-peer transmissions are supported by the first wireless device, or indicates that the triggered uplink single-user transmissions and the triggered peer-to-peer transmissions are both supported by the first wireless device.

27. The apparatus of claim 23, wherein at least one of:
the first wireless device is an access point or a station and the second wireless device is an access point or a station, or
the second wireless device is affiliated with a multi-link device (MLD).

28. The apparatus of claim 23, wherein the first wireless device is a first access point and the second wireless device is a second access point.

29. An apparatus for wireless communications at a second wireless device, comprising:
one or more processors;
memory coupled with the one or more processors; and
instructions stored in the memory and executable by the one or more processors to cause the apparatus to:
transmit to a first wireless device, a first frame comprising one or more fields indicating that the second wireless device supports a first triggered transmission opportunity sharing mode of a plurality of different triggered transmission opportunity sharing modes, the first triggered transmission opportunity sharing mode indicating that the second wireless device only supports triggered peer-to-peer transmissions;
receive, in accordance with the first frame, a second frame that triggers a peer-to-peer transmission by the second wireless device during a transmission opportunity sharing duration; and
transmit, based at least in part on the first frame, the peer-to-peer transmission.

30. The apparatus of claim 29, wherein the instructions to transmit the first frame are executable by the one or more processors to cause the apparatus to:
transmit a set of bits in a field of the first frame indicating that the second wireless device supports the first triggered transmission opportunity sharing mode of the plurality of different triggered transmission opportunity sharing modes.

* * * * *